United States Patent
Pham et al.

(10) Patent No.: US 6,282,535 B1
(45) Date of Patent: Aug. 28, 2001

(54) DIGITAL SIGNATURING METHOD AND SYSTEM FOR WRAPPING MULTIPLE FILES INTO A CONTAINER FOR OPEN NETWORK TRANSPORT AND FOR BURNING ONTO CD-ROM.

(75) Inventors: Thien Huu Pham, Garden Grove; Lauren Ann Cotugno, Dove Canyon; Edward Henry Frankel, Rancho Cucamonga, all of CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/191,395

(22) Filed: Nov. 13, 1998

(51) Int. Cl.[7] .............................. G06F 12/00; G06F 13/00
(52) U.S. Cl. ................................ 707/4; 707/104; 710/74; 713/176
(58) Field of Search .............................. 710/74; 713/176; 707/104, 10, 4, 9

(56) References Cited

U.S. PATENT DOCUMENTS

| | | | |
|---|---|---|---|
| 5,809,145 | * | 9/1998 | Silk et al. .............................. 380/25 |
| 5,870,756 | * | 2/1999 | Nakata et al. ....................... 707/200 |
| 5,983,295 | * | 11/1999 | Cotugno ................................. 710/74 |
| 6,035,323 | * | 3/2000 | Narayen et al. ..................... 709/201 |
| 6,079,047 | * | 6/2000 | Cotugno et al. ..................... 714/807 |
| 6,085,266 | * | 7/2000 | Cotugno ................................. 710/68 |
| 6,088,747 | * | 7/2000 | Cotugno et al. ....................... 710/74 |

* cited by examiner

Primary Examiner—Jean R. Homere
(74) Attorney, Agent, or Firm—Alfred W. Kozak; Mark T. Starr; Lise A. Rode

(57) ABSTRACT

A container of data files and directory in a specialized first format are converted (wrapped) into an industry-standard text container file into a protocol suitable for Internet transmittal. A Signature Support Library and several procedural routines, together with parameters from the Support Library are utilized to combine with a user's private key to generate a signature particular to the container data file which has been converted. The container now with signature resides in a protocol suitable for transmission on the Internet or for burning onto a CD-ROM which is now usable for different platforms other than the original file protocol of a first platform which was only compatible with said specialized first format of the first platform.

4 Claims, 17 Drawing Sheets

- OVERVIEW OF DIGITAL SIGNATURING AND WRAPPING MULTIPLE FILES INTO A CONTAINER

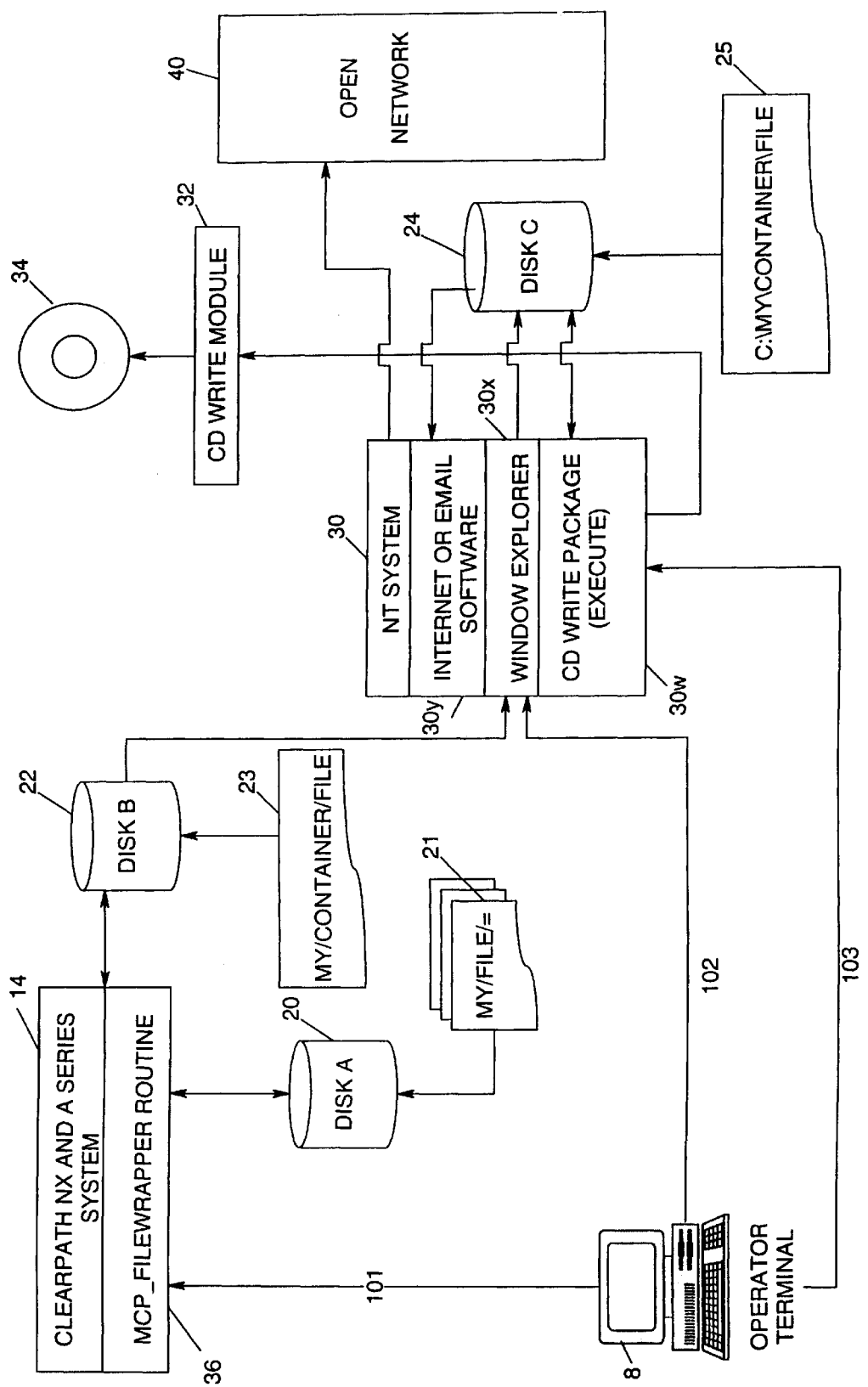
FIG. 1A - OVERVIEW OF DIGITAL SIGNATURING AND WRAPPING MULTIPLE FILES INTO A CONTAINER

| (i) | (ii) | (iii) | (iv) | (v) | (vi) DIGITAL SIGNATURE | |
|---|---|---|---|---|---|---|
| "UNISYS000010" | <OPTIONS> | THE A SERIES DISK FILE HEADER +HEADER CHECKSUM | <THE FILE> | <CHECKSUM> | R | S |

*FIG. 3A*

| <CONTAINER ID> | <DIRECTORY LOCATION> | CONTAINER OPTION WORDS: SIGNATURE INDICATOR SSR LEVEL, SIGNATURE ADDRESS, ETC., AND CONTAINER CHECKSUM | THE WRAP FILES | <DIRECTORY ID> | <DIRECTORY OF FILE NAMES AND THEIR LOCATIONS IN CONTAINER> | <DIGITAL SIGNATURES R & S> |

FIG. 3B: LAYOUT OF A CONTAINER FILE WITH DIGITAL SIGNATURE

| "UNISYS000010" | <OPTIONS> | THE A SERIES DISK FILE HEADER & HEADER CHECKSUM | <DATA OF THE FILE> | <CHECKSUM OF THE FILE> |

FIG. 3 C: LAYOUT OF A WRAPPED FILE WITHIN A SIGNATURED CONTAINER

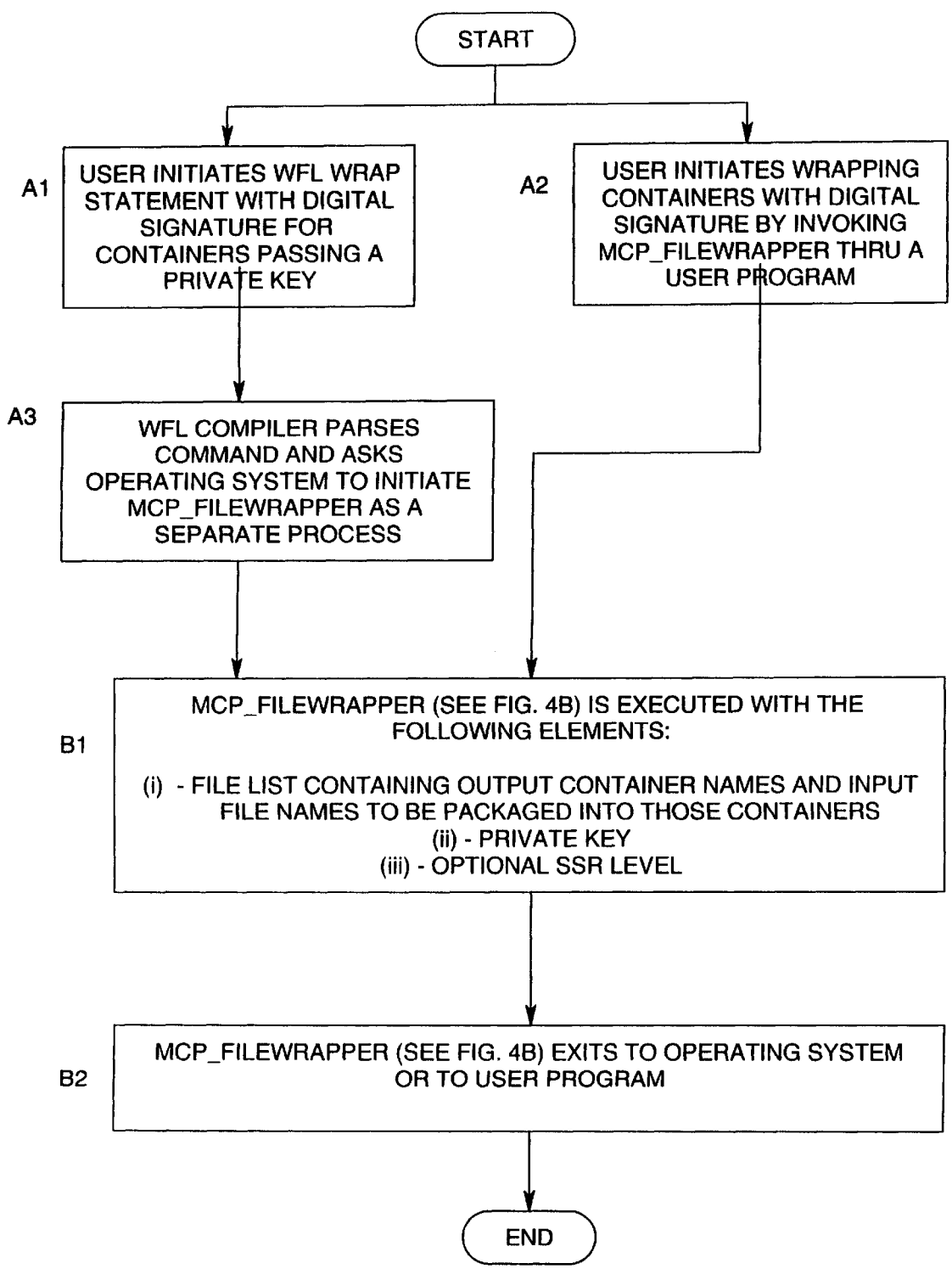
FIG. 4A: THE OVERALL PROCESS OF SIGNING AND WRAPPING CONTAINER FILES

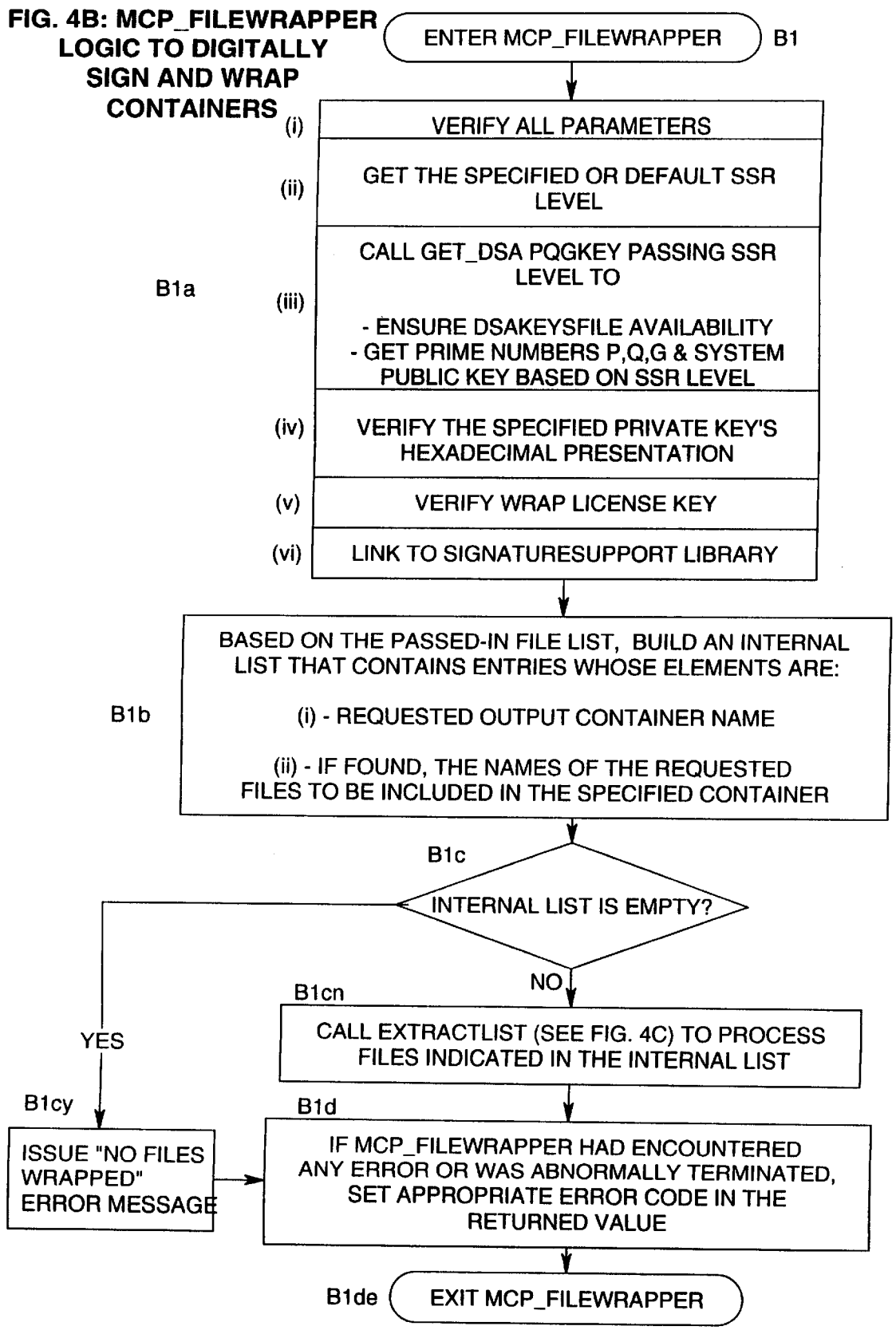

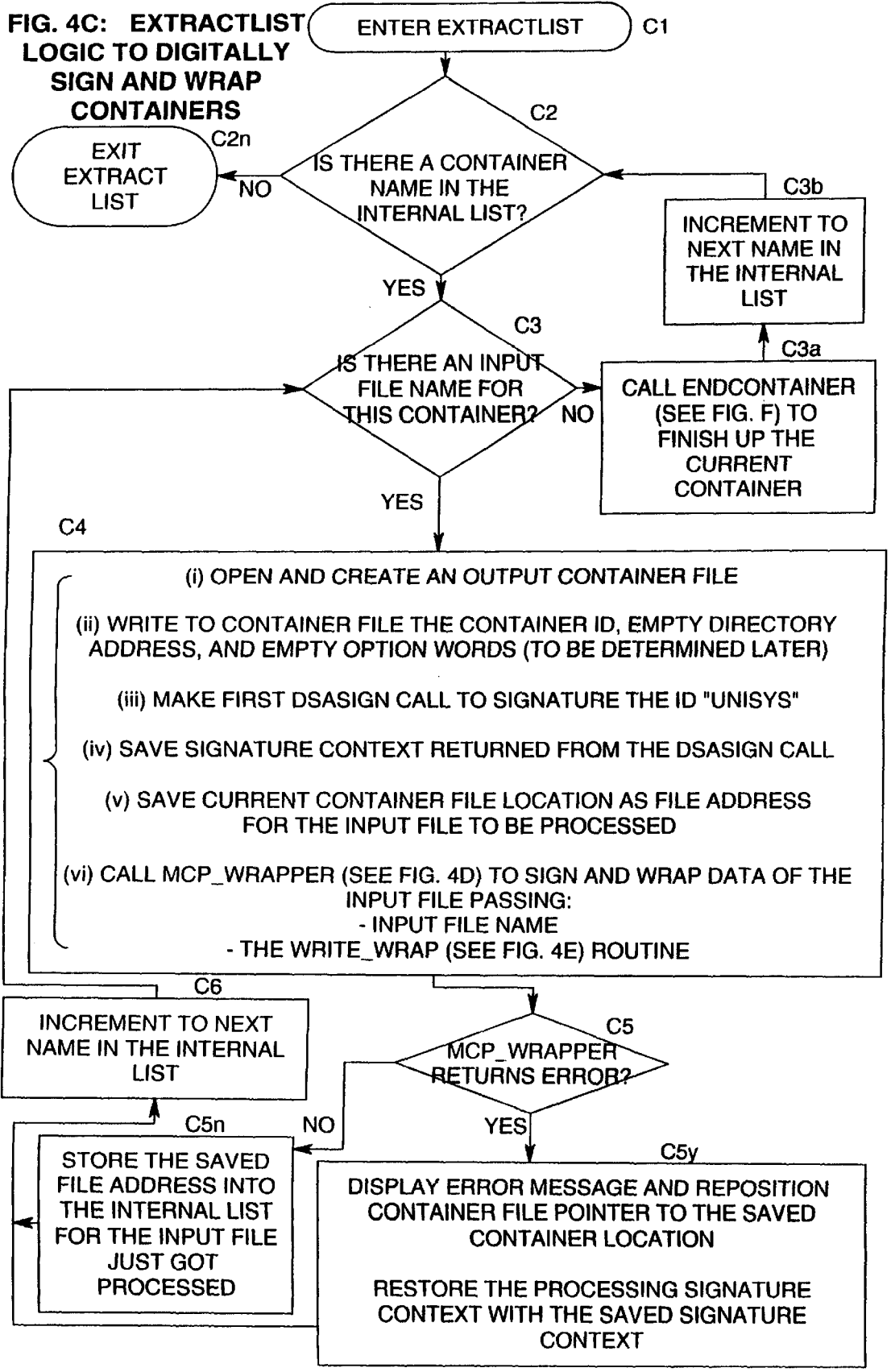
FIG. 4C: EXTRACTLIST LOGIC TO DIGITALLY SIGN AND WRAP CONTAINERS

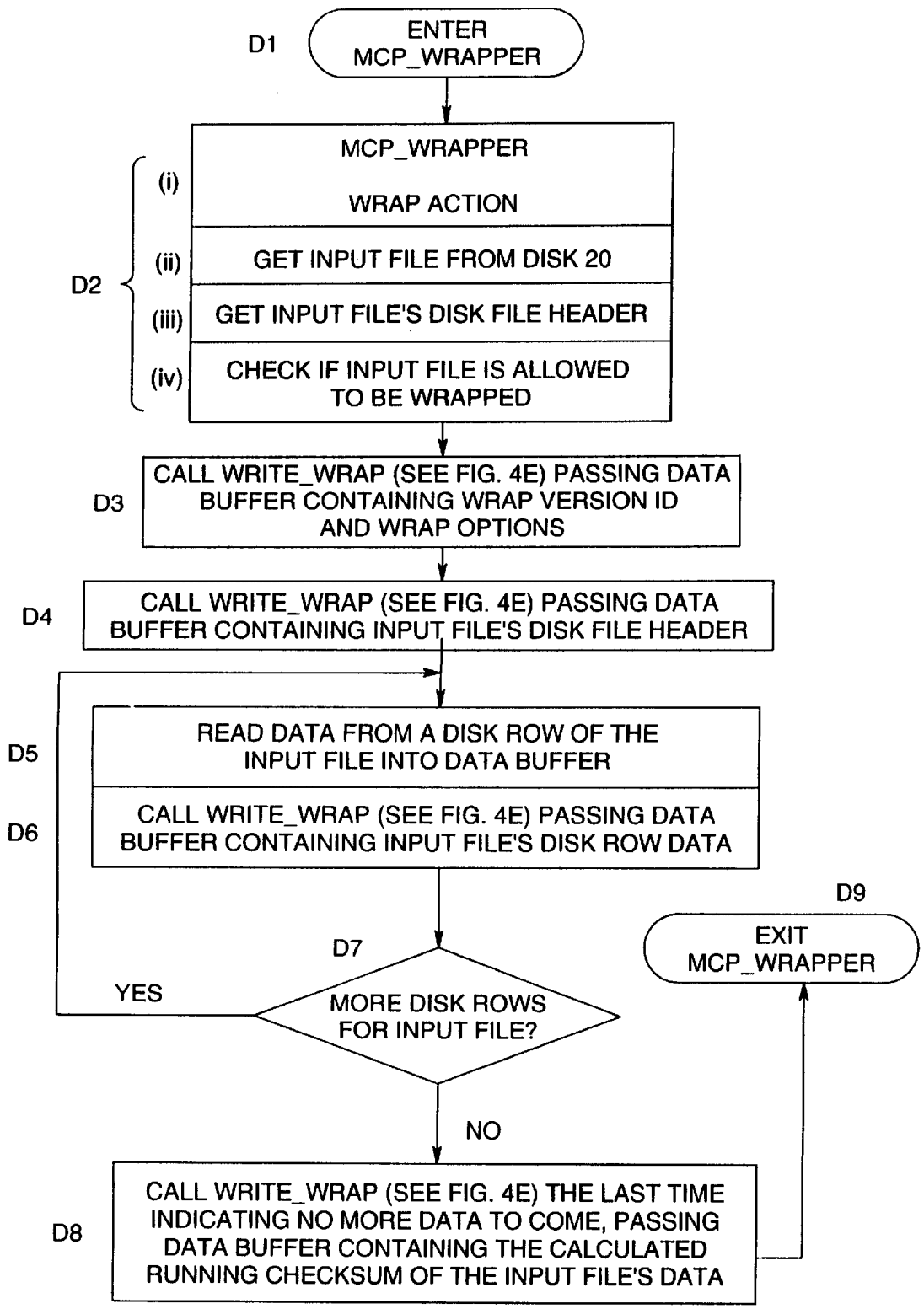
FIG. 4D: MCP_WRAPPER LOGIC TO DIGITALLY SIGN AND WRAP SINGLE FILES

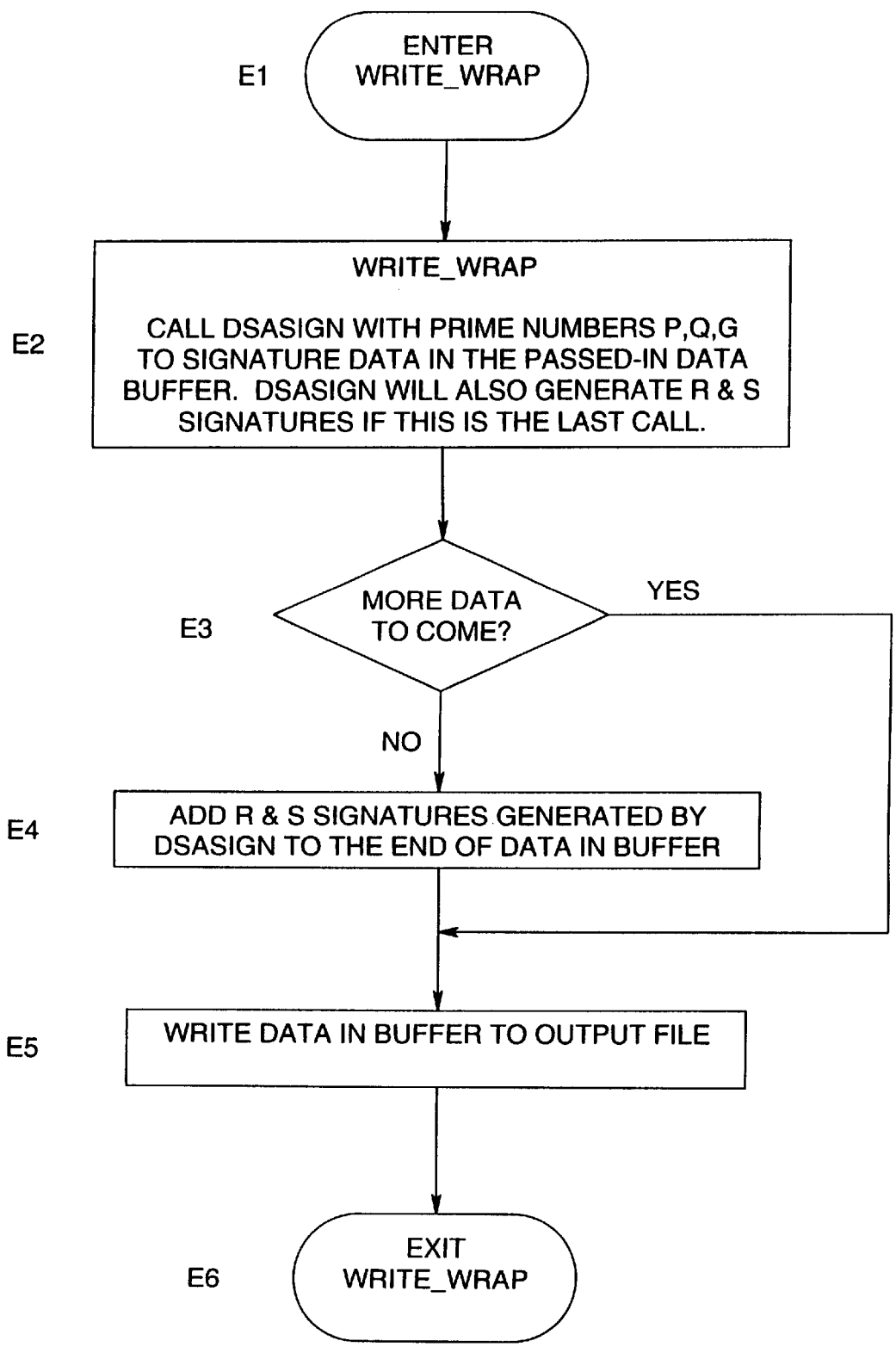
FIGURE 4E: WRITE_WRAP LOGIC
TO DIGITALLY SIGN AND WRAP SINGLE FILE

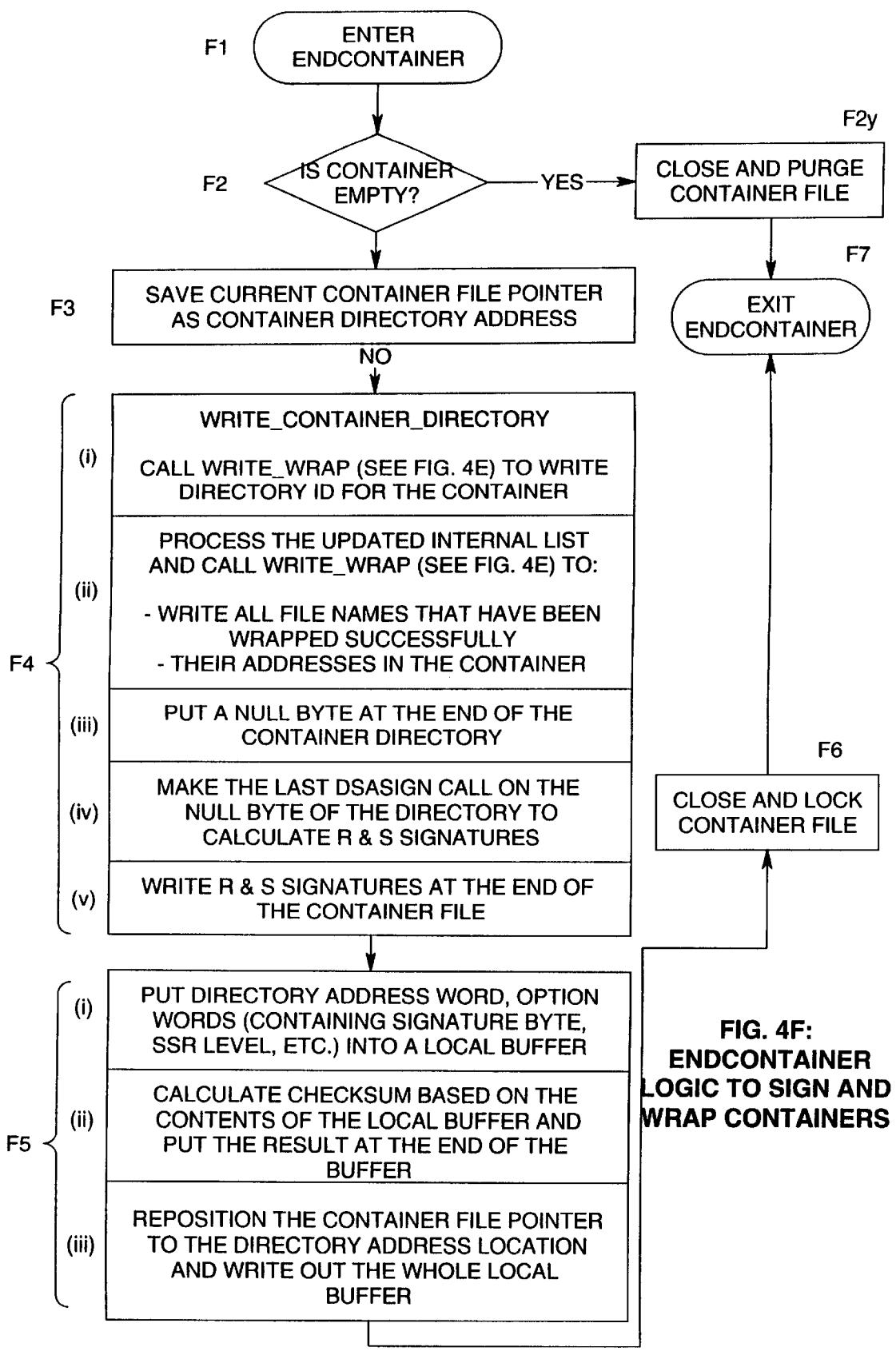
FIG. 4F: ENDCONTAINER LOGIC TO SIGN AND WRAP CONTAINERS

FIGURE 5: - CREATING A DSA KEYSFILE

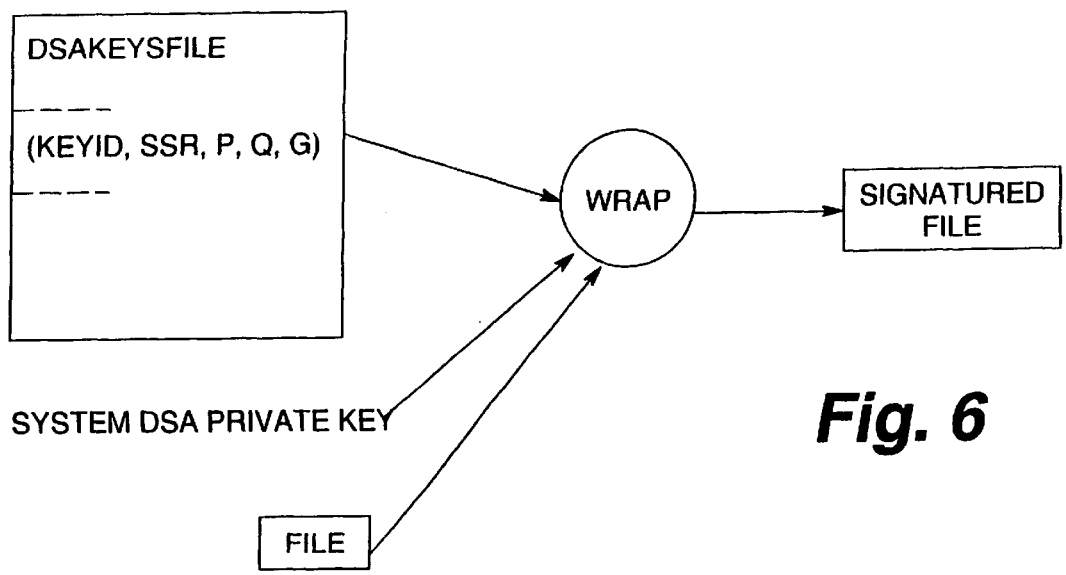
FIGURE 6: - WRAP AND SIGNATURE A FILE
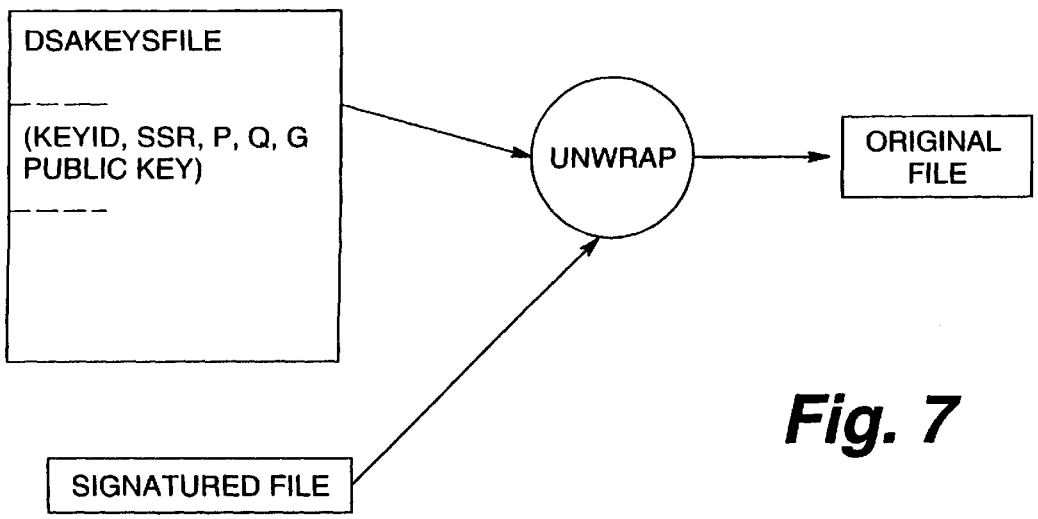
FIGURE 7: - VERIFY AND UWRAP A SIGNATURED FILE

DIGITAL SIGNATURING METHOD AND SYSTEM FOR WRAPPING MULTIPLE FILES INTO A CONTAINER FOR OPEN NETWORK TRANSPORT AND FOR BURNING ONTO CD-ROM.

CROSS-REFERENCES TO RELATED APPLICATIONS

This application is related to several co-pending applications designated as follows: (i) U.S. Ser. No. 08/962,468 entitled "Method and System for Wrapping Single Files for Burning Into Compact Disk"; (ii) U.S. Ser. No. 09/026,743 entitled "Method and System for Wrapping Multiple Files to a Container for Burning Onto Compact Disk; (iii) U.S. Ser. No. 09/124,557 entitled "Digital Signaturing Method and System for Packaging Specialized Native Files for Open Network Transport and For Burning Onto CD-ROM" each of which are incorporated herein by reference.

FIELD OF THE INVENTION

This system relates to methods for enabling and signaturing one or more files which are organized in a first native format to be packaged (wrapped) into a single container file in a second format suitable for burning onto an industry-standard Compact Disk or to be transported via standard protocols and utilized outside their native environment and in networks utilizing different data formats.

BACKGROUND OF THE INVENTION

In the usage of modern computer systems and networks, the situation arises where systems having one proprietary protocol and data format are connected to systems having different data formats and protocols. Thus in order to provide for systems integration in different networks, it is necessary that there be provided a system or method whereby the data formats of a first system can be transferred to and utilized by the network of a differently oriented system.

For example, the Unisys A Series computer systems involve a Central Processing Unit and memory together with storage such as disk storage which operates under the control of a Master Control Program. These A Series systems use a particular format for the data files compatible with the A Series software which can be placed on CD-ROMs. Thus, the CD-ROMs which contain this A Series software contain an image of a formatted tape which can be utilized only by the A Series systems.

However, when it is desirable to integrate a first system such as the A Series systems for operation with other platforms such as an NT system, then problems arise in that the second system such as the NT system, utilizes formats which are not compatible with the software formats of the A Series system, which is the first system.

Presently, the software for a first system, such as an A Series system with software, is utilized by providing methods to burn CD disks from a Library Maintenance formatted tape. This method has the limitation in that it limits the type of files that are burned into CD-ROMs to those of the native A Series files.

Now, in order to provide for system integration where an A Series system is to be coupled to a NT system, which overall system would be designated as a Unisys ClearPath system, the desirability here would be to make and use a single CD-ROM disk which would carry both the A series software and at the same time carry the NT software.

Thus in this regard, a method is needed to couple the A Series files with their native attributes and also arrange them in a format capable of being stored on a particular media such as a CD-ROM which will also hold the readable software for the NT system.

The same system or method also provides the ability to package files of a proprietary system in such a way that allows the files to be transported across an open (non-proprietary) network without losing their original characteristics. When such files return to their native environment, their true data formats can be restored.

For example, the A Series systems have files with specialized attributes such as FILEKIND, CREATIONDATE, RELEASEID, etc. When these files are transferred to a PC running Windows NT, all those attributes will be lost. By packaging the files and their attributes into standard, simple text files, the now files then can be transported across any open system (e.g., UNIX, NT). Upon reaching their destinations (which are other A Series systems), the text files are converted back to their native forms with all the right attributes. This is ideal for maintaining A Series data formats in a heterogeneous networking environment.

A digital signature is calculated for every file or container of files, as it is being WRAPPED (packaged). This signature is calculated using the Disk File Header (DFH) and the data within the file, along with the Public/Private key pair. This will ensure that there is no intentional corruption of the Disk File Header (DFH) and the data as the file is shipped across a network. It will also provide the receiver of the file a certain measure of confidence as to the origin of the file. Additionally to the signature, there will be calculated a checksum for the entire contents of the file, including the Disk File Header.

When a file is wrapped with a request for digital signature, its Disk File Header will have a checksum, its entire file will also have another checksum, and a digital signature will be calculated for the entire contents of the newly wrapped file. The functionality of wrapping files with digital signature is available through the WFL syntax as well as through programmatic interface.

As a result, the Unisys A Series systems will provide a programmatic interface to its Master Control Program (MCP) which will provide a mechanism for "wrapping" containers with signature and for "Unwrapping" signed wrapped containers.

Wrapping is a term which is used to define the process of packaging an A Series file, along with its Disk File Header information and a checksum and optionally a digital signature, as a byte-stream data file, so that it can be transported across heterogeneous networks and non-A Series specific media, while still maintaining its native A Series attributes.

Unwrapping is a term used to define the process of taking a previously "wrapped file" and coupling it with the information from its original Disk File Header (DFH) in order to restore the original native A Series file, as it existed prior to being wrapped.

Thus, the problem of a software and file format which is oriented to one specialized system can now be transformed in order to provide a format that is utilizable not just for a first system, but also for a first and second system, whereby the second system would not ordinarily be compatible with the first system. Thus, it is desirable to allow files (created on a Unisys ClearPath HMP/NX system or A-Series system) to be transformed so they can travel across a completely different system (such as NT) without loss of the file's original native characteristics.

The presently described system and methods provide for taking one or more files in a first format such as used in Unisys A-Series systems and putting them into a single container file of a second generalized format for transport to an open network without losing the native attributes and for burning into a CD-ROM such that now this container file format is compatible for both NT and other systems in addition to A-Series systems.

The second file format container will provide a signature to be created for the entire file. This is so, since the checksum is not sufficient to ensure that a Disk File Header has not been intentionally corrupted, since the checksum algorithm is not protected, and could easily be reproduced. A signed, wrapped container file can be sent to another user through e-mail, through the Internet, or put into an industry-standard CD-ROM.

Thus, the packaged (wrapped) container file can be transported to an open network without loss of the native attributes and can be burned onto an industry-standard CD-ROM without loss of native attributes. In each case, a digital signature is generated to ensure the integrity of the packaged file.

CONTAINER: "A container", as used herein, involves a byte stream file, usually holding multiple files, together with a "directory" of the files that are stored. There is a considered distinction between a "wrapped file" and a "wrapped container". The wrapped container is a special file whose contents include one more wrapped files and a directory. A single wrapped file has no directory within itself.

SUMMARY OF INVENTION

An algorithmic sequence is implemented in software for providing and developing specialized multiple native files and a directory into a container with digital signature option. The new container file is stored in a standard text file format such that it can be transported to and across an open network while still maintaining all native characteristics of the files it holds. Containers can also be burnt together with files originated from other platforms onto the same industry-standard Compact Disks (CD-ROMs) which then can be viewed and utilized by a variety of systems.

The present system is applicable in the Unisys ClearPath environment which involves a situation where two systems are connected to and communicating with each other, for example, such as that both a Microsoft NT platform and a Unisys A Series platform can both read from the same Compact Disc in a compatible fashion. Thus, this makes it possible to put the NT platform software and the A Series platform software all on the same CD-ROM. With the use of such a uniform standard Compact Disk, an operator can load and use the NT platform in order to pull the NT software he needs from the CD-ROM by using an "Install" procedure which accesses the information on the Compact Disk. Likewise, a person using the Unisys A-Series platform can also pull A-Series files from a container file or stored on the CD-ROM by using the WFL_UNWRAP command in order to load the A-Series software from the Compact Disk.

The present system is also applicable in a heterogeneous networking environment where one Unisys A Series system needs to transport its native files across computers of different platforms (for example, UNIX, Windows NT) to another Unisys A Series system.

The method enables native files to be encoded into one single container in such a way that the container can be treated as a simple text file by any computing platform and still be able to restore files in the container back to their original forms by an A-Series machine without losing the original native attributes.

For security and data integrity reasons, the Master Control Program of the A Series computer generally cannot trust files, particularly code files that come from external sources. Thus, the method creates a digital signature for a container to ensure that none of the files it holds is tampered with either intentionally or unintentionally during the container's transit.

BRIEF DESCRIPTION OF THE DRAWINGS

FIG. 1A is a general overview of the present system for digital signaturing and developing a transportable container file;

FIG. 3A is an illustration of the format for a WRAPPED-DATA file with checksum and digital signature as a bytesteam file;

FIG. 3B illustrates the layout of a container file with digital signature;

FIG. 3C shows the layout of a wrapped file within a signatured container;

FIG. 4A is a flow chart illustrating the overall process of signaturing and wrapping container files;

FIG. 4B is a flow chart illustrating the MCP_FILEWRAPPER logic to digitally sign and wrap containers;

FIG. 4C is a flow chart illustrating the EXTRACTLIST logic to digitally sign and wrap containers;

FIG. 4D is a flow chart illustrating the MCP_WRAPPER logic to digitally signature and wrap a single file;

FIG. 4E is a flow chart illustrating the WRITE_WRAP logic to digitally sign and wrap a single file;

FIG. 4F is a flow chart illustrating the ENDCONTAINER logic to sign and wrap a container;

FIG. 6 is a block diagram to show how to wrap and signature a file;

FIG. 7 is a block diagram to show how to verify and unwrap a signatured file.

GLOSSARY ITEMS

Figure 1B:
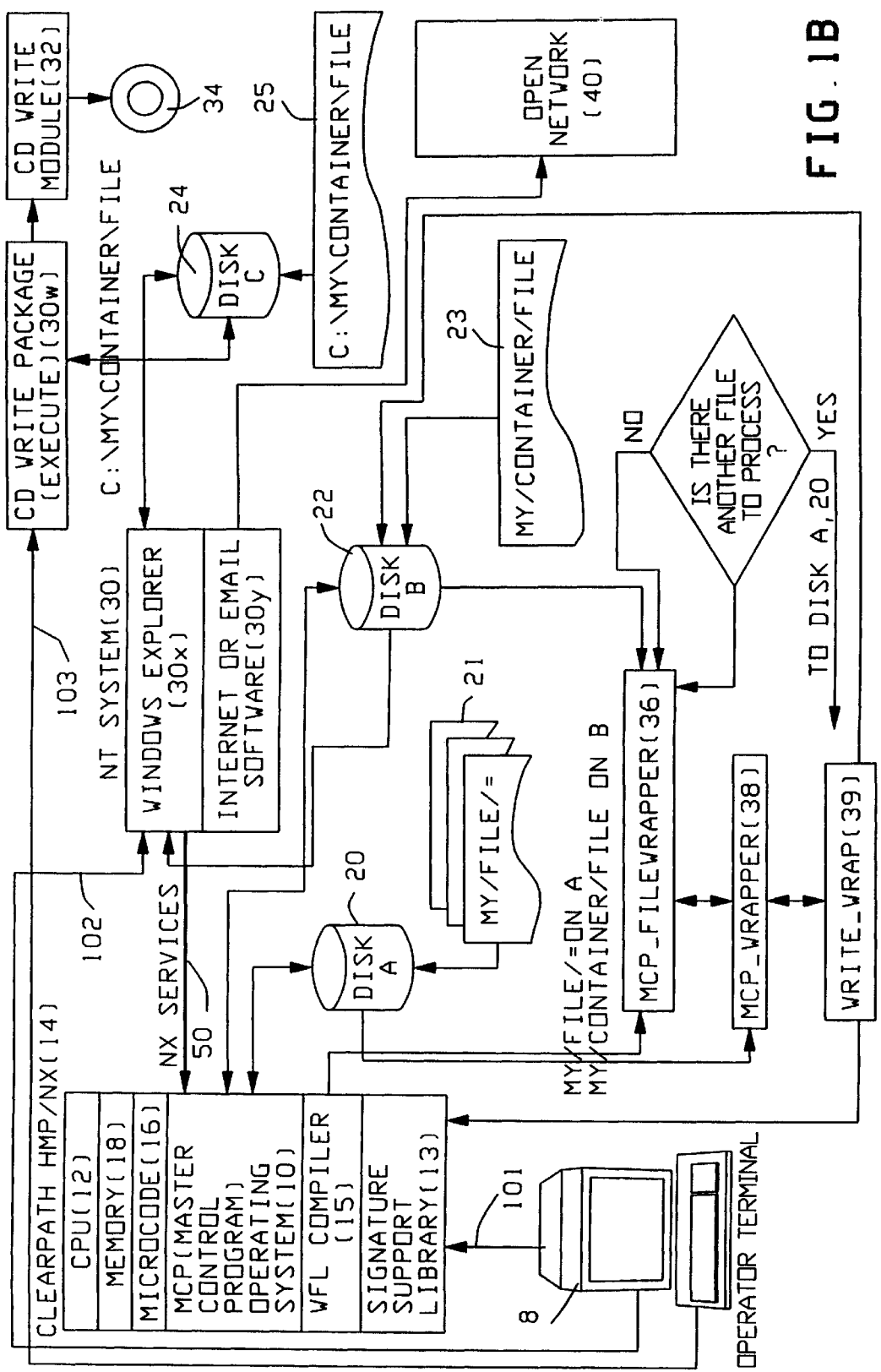
FIG. 1B is a more detailed block diagram of the system which enables digital signaturing, the packaging of a transportable container file and burning-in of a Compact Disk with a container file which is compatible to both a first protocol system and a second protocol system.

1. A SERIES ATTRIBUTES: Native attributes that can be assigned to a file to allow the system to control how the file is accessed and used, and by whom (security privileges). There are somewhere on the order of 450 such attributes for Unisys A Series files.

2. A SERIES KEYS FILE: A native file, located on a individual system, that contains license key information used to control which features an individual system is allowed to use for some features. License keys need to be purchased by the user before the feature can be utilized on the individual system.

3. ATTRIBUTE INFORMATION OF A SERIES FILES: Specific attributes assigned to individual files stored in the file's Disk File Header (DFH) on Disk.

4. BYTE-STREAM FILE: A character oriented file with FILESTRUCTURE=STREAM, MAXRECSIZE=1, AND FRAMESIZE=8. This is a simple, non-executable, data file that can exist on any kind of system.

5. DATA CD-ROM: See ISO 9660 Format (Item 12 below). These CD's appear like disks on A Series systems. Multiple user access is allowed to these CDs.

6. DIGITAL SIGNATURE: A digital signature is a hash pattern created by applying an industry standard signaturing algorithm (similar to a checksum) to a file or data stream, along with a private key. This hash pattern travels with the file across a network and in used, along with a public key, in order to ensure the file has not been compromised (intentionally or otherwise) during the transfer process.

7. CONTAINER: A single byte-stream file consisting of one or more wrapped files, a simple directory of files stored in the container, and optionally a digital signature.

8. CREATIONDATE: An A Series (Unisys) file attribute, used to store the data and time a file was created. 9. FILEDATA—LFILE: An A Series (Unisys) program, or utility, used to interrogate attribute information of native A Series files.

10. FILEKIND: An A Series (Unisys) file attribute, used to identify the internal structure of the file being accessed (e.g. Algol symbol, Algol object code, character data, or system directory).

11. INTERIM CORRECTION PROCESS (ICP): The process used by Unisys computer systems to deliver software updates to released products held by customers.

12. ISO 9660 FORMAT (A.K.A. ISO STANDARD FORMAT, HIGH SIERRA FORMAT): A standard format used for directories and files on CD-ROM disks. The presentation for the information contained on these directories is at the operating system's discretion. On Unisys A Series systems, directories and files are viewed using the standard CANDE "FILES" and ODT "PD" commands. CANDE represents a Command and Edit program.

13. LIBRARY MAINTENANCE FORMAT: A Unisys proprietary format for tapes containing multiple files used primarily for archives, backup or restore, and transferring of files among A Series systems.

14. LIBMAINT CD-ROM: A specially formatted CD-ROM, created on an ISO 9660 Formatted CD-ROM, that contains an image of a Library Maintenance tape. This appears to an A Series system as if it were a Library maintenance tape. Only one user is permitted access at a time, and only COPY (and COPY-related) syntax, and Filedata TDIR are allowed to act on this CD.

15. NATIVE A SERIES FILES: A file created on Unisys A Series systems or ClearPath HMP/NX systems specifically for use on that same class of systems.

16. NON A SERIES FILES: Files that were created on systems other than Unisys A Series or ClearPath HMP/NX systems.

17. NEW FORMAT FILE: the Byte-Stream data file that results from executing the WRAP process on an A Series file.

18. NT SOFTWARE—CD BURN PROCESS: Any standard "Off-the-shelf" package capable of burning images on to a Compact Disk (CD) that runs on a Microsoft NT system. 19. P, Q, G, keys: Primary numbers, stored in the system's digital signature keys file and used in the creation of public/private keys as well for both signing files and verifying the signatures of files, using the public and private keys.

20. PUBLIC & PRIVATE KEYS: Public and private key pairs are generated at the same time by a special utility. These key pairs are used to create a signature and then later check that signature to ensure that a file has not been compromised. These keys are generated together and must be used together to ensure the integrity of a file. Under normal operations, the private key is intended to be known only by the person or utility generating the hashed signature of the file. This key is meant to be restricted. The public key can be made available to any person or utility wishing to check the signature to ensure the integrity of the file once it has reached its destination.

21. PUBLIC/PRIVATE ENCRYPTION: A common methodology for encrypting files so they may be transported across an open network so as to use a public/private password encryption scheme. Typically, the two passwords are programmatically generated at the same time such that they can be used in conjunction with each other. One password, the private one, will be used to encrypt the file. The other password, the public one, is used by the recipient of the file to decode it. Typically, a smear pattern, or some clear text string, is added at the beginning of the file before the file is encrypted. When the file has been decoded using the public password, this smear pattern should match what was originally placed in the file. If the string does not match, it can be assumed that the integrity of the file has been compromised.

22. RELEASE ID: A Unisys A Series file attribute, used to store the specific "release level" that the software was created for.

23. SHARE: A Directory or disk that is made available to selected or all users across a network.

24. UNWRAP The process of taking a previously wrapped file (or data stream) and coupling it with the information from its original Disk File Header, to re-create the original native A Series file as it existed prior to being wrapped.

25. WFL SYNTAX: Work flow language syntax, used to control job flow on a system.

26. WFL UNWRAP syntax: Specific work flow language syntax used to execute the unwrap process on a file, or files.

27. WRAP: The process of packaging an A Series file, along with its Disk File Header information and a digital signature, as a data stream, or as a byte-stream data file (FILESTRUCTURE=STREAM, MAXRECSIZE=1, FRAMESIZE=8), so that it can be transported across heterogeneous networks and non-A Series specific media, while still maintaining its native A Series attributes.

28. INPUT FILE: The already existing file that is to be packaged into a byte-stream text file by the wrap process.

29. OUTPUT FILE: The resultant byte-stream text file created by "wrapping" the input file.

30. DSA: Digital Signature Algorithm—used to create a digital signature for a file container or data stream. It should not be confused with any data encryption algorithm since the data is not encrypted by any means.

31. DSA INFORMATION SET: This term is used loosely here. It is essentially the same as DSA Key Set, but without the system DSA public key. DSA=Digital Signature Algorithm.

32. DSA KEY SET: A set of DSA information which consists of {KeyID, SSR level, Prime P, Prime Q,G, system DSA public key} for a particular software level. Only one set is created for a software release. SSR represents System Software Release.

33. DSA KEYSFILE: The system file that contains one or more DSA key sets. If the file is titled as *SYSTEM/DSAKEYSFILE and is stored on the halt/load pack, it is considered as the active system DSA keysfile.

34. SIGNATURING: The process of applying the Digital Signature Algorithm to a file while wrapping it into a WRAPPEDDATA or CONTAINERDATA file. The resulting file is said to be digitally "signatured" or "signed".

35. SYSTEM DSA PRIVATE KEY: A DSA private key created for the sole purpose of signaturing Unisys-released software. It is kept secret by the Unisys Software Releases (and/or Support Group). Only one system private key exists per release. Its counterpart—the system public key—is stored in the system DSA keysfile.

36. SYSTEM DSA PUBLIC KEY: A DSA public key created for the sole purpose of verifying wrapped software signed by the Unisys Software Releases (and/or Support Group) using a corresponding system DSA private key. Only one system public key exists per release and is stored as part of a DSA key set in the system DSA keysfile.

37. VERIFYING: The process of validating the digital signature of a WRAPPEDDATA or CONTAINERDATA file before unwrapping it.

38. WRAPPED FILES: Files created as a result of the wrapping process—See wrapping.

39. SL (SYSTEM LIBRARY): SL is a Unisys A-Series MCP systems operation used to declare that a codefile or program, is to be considered a "System Library" for execution purposes. It allows for other programs to access the functions in that library without knowing much of anything about the library itself. The operating system will have knowledge about where the library is located on the disk, and control over which programs are allowed to link to the library for the purpose of accessing its routines.

40. MASTER CONTROL PROGRAM (MCP): This is the Operating System (OS) of the Unisys A Series and ClearPath platforms.

GENERAL OVERVIEW

As seen in FIG. 1A, a user terminal 8 is connected to a first operating system 14, such as a Unisys A Series computer, having outputs to a disk A,20 and a disk B,22.

A second operating system, such as NT platform system 30, utilizing the Microsoft Explorer program 30x, Internet or e-mail program 30y, and a CD Write Package 30w, communicates with disk C,24 so that the User terminal 8 can initiate the CD Write Package 30w to energize the CD Write Module 32 in order to burn a container onto the compact disk (CD) 34.

The disk A,20 holds directory of files designated as MY/FILE/=(21). The Disk B,22 holds the resultant container file designated MY/CONTAINER/FILE,23. The Disk C,24 holds a copy of the Container File designated C:\MY\CONTAINER\FILE,25 on the NT side. The data 25 of Disk C,24, is controlled by the CD Write Package 30w for transmittal to the CD Write Module 32 for burning into the compact disk (CD) disk 34. The Internet/e-mail programs 30y enable transmittal of a packaged container (wrapped) to the open network 40. It may also be noted that Disk A and Disk B could actually be the same physical device. It is not necessary that they always be two separate entities.

In summary, the User terminal 8 will use the channel marker cycle designated 101 to the first system computer 14 to wrap a number of files (21) on Disk A,20 into a single container file 23 on Disk B,22 by using the WFL_WRAP statement.

Then using channel marker cycle designated 102, the User terminal 8 will communicate with the NT system 30 having Microsoft Windows Explorer program 30x, in order to start an operation which drags the resultant container file (23) from the A-Series' Disk B,22, and drops the file onto the NT systems' Disk C 24, under the name C:\MY\CONTAINER\FILE(25).

The User terminal 8 using the designated channel marker cycle 103 then executes the CD Write Package 30w by initiating the CD Write Module 32 in order to burn the file 25, C:\MY\CONTAINER\FILE, on to the CD (compact disk) unit 34.

Finally at this time, the resultant file data on the compact disk 34 in in a protocol compatible for usage by other platforms.

In FIG. 1A, the second system designated as the NT system 30 could also be designated alternatively as a UNIX system, in which case, the NX services 50 shown in FIG. 1B would not be required and the Microsoft Explorer program 30x of FIG. 1A would be replaced by the industry-wide standard File Transfer Protocol (FTP).

FIG. 1B will be subsequently described herein to indicate the hardware system in greater detail.

DESCRIPTION OF PREFERRED EMBODIMENT

Referring to FIG. 1B, there is seen a drawing of the major elements involved in the present system.

A first system is shown, for example, such as a Unisys A Series ClearPath computer Operating System 14 which involves a Central Processing Unit 12, a main memory 18, a microcode memory 16 which is managed by the MCP 10 (Master Control Program). The CPU 12 is also supported by a storage media 20, Disk A, which carries an original directory of files 21, designated MY/FILE/= which are formatted suitably for the first system such as the A Series computer system 14 and Disk B,22, which will be processed and stored into a new file designated MY/CONTAINER/ FXLZ, which is formatted for transport to a second system.

Now, in the sense of integrating to other systems, there is seen a second system called the "NT System 30" (alternatively a UNIX, IBM or other system) which is a platform developed by the Microsoft Corporation of Redland, Wash. The NT System 30 is seen having a storage medium 24 such as Disk C, which will eventually be provided with a transferred copy of the resultant container file designated C:\MY\CONTAINER\FILE,25.

The A-Series system 14 is provided with a WFL (Work Flow Language) compiler 15 which is an interpretive language capable of taking User instructions and translating them into Operating System (O.S.) procedure calls. The MCP 10 has a communication relationship relationship to the NT system 30 through use of an NX Services unit 50.

NX/Services 50 is a software unit used to integrate MCP operations with NT platform operations through the use of a Microsoft (MS) Standard RPC (Remote Procedure Call) interface.

The WFL compiler 15 is an interpretive compiler which provides a new language syntax using the word "Wrap".

The Operator Terminal 8 of FIG. 1B, is the operator interface in which an operator would enter a command such as WRAP MY/FILE/=AS MY/CONTAINER/FILE FROM Disk A TO B, which is the directory of files 21 residing on Disk A and the file 23 (FIG. 1B) residing on Disk B. This command is transmitted through the MCP (or Master Control Program 10) in order to initiate the action of the WFL compiler program 15.

The MCP 10 then calls the MCP_FILEWRAPPER routine 36 passing parameters built by WFL 15 as the input to this routine. The MCP_FILEWRAPPER routine 36 determines the presence of all files stored under the specified directory MY/FILE/=21 and build an internal list containing all the file names it found so that they can be processed later.

Then for each file name in the internal list, the MCP_ FILEWRAPPER process 36 will call MCP_WRAPPER routine 38 indicating that the file should be processed, wrapped and signed.

Thus, the MCP_WRAPPER routine 38 communicates back to Disk A and reads in the file starting with its Disk File Header (DFH) information and then its "rows" of data. For each buffer read, MCP_WRAPPER 38 calculates the running checksum of the file and calls the WRITE_WRAP routine 39 to calculate the running signature of the container as well as to write the data out to the temporary output file MY/CONTAINER/FILE on Disk B.

When there are no more rows of data, the MCP_WRAPPER routine 38 determines the final checksum of the file and calls WRITE_WRAP to write the checksum out to the container file MY/CONTAINER/FILE before returning to MCP_FILEWRAPPER routine 38. MCP_FILEWRAPPER repeats the whole process for the next file name in the internal list.

When the internal list is exhausted, MCP_WRAPPER 36 calls WRITE_WRAP directly to write out the container directory which consists of the file names that have been processed and their locations in the container. MCP_WRAPPER then calculates the final signature words and calls WRITE_WRAP to store the signature at the end of the container.

The MCP_WRAPPER routine 38 returns to MCP_FILEWRAPPER 36 and tells it to make the file MY/CONTAINER/FILE 23 on Disk B,22 permanent. As a result, there is now a data file provided onto the storage Disk B,22. This file, MY/CONTAINER/FILE,23 is now available to the NT system platform 30 from the file 23 residing on Disk 3,22.

Another example of a problem that arises is the situation where there are two separate and different A Series computers, whereby the first computer has data and information (files) which it is desired to give or present for use by the second computer system. Normally, if the first system file in in object code, it is then necessary to put it on a tape and mail it to the second computer User or alternatively, to have the first system and second system connected to each other through a proprietary network connection. However, this is sometimes a long and cumbersome process, when it would be most desirable to be able to transmit it electronically to the second user through an open network such as e-mail or FTP (File Transfer Protocol).

Thus in the present system, the first computer system user would create a container file by doing a Wrapping operation using either the Work Flow Language (WFL) WRAP statement or using a user program that interfaces with the MCP routine MCP_FILEWRAPPER 36 (or MCP_WRAPPER 38 if no digital signature is required). This container can then be sent to the second A-Series computer via an open network of different computing platforms.

Thus, what has been accomplished is to take a number of A-Series files and repackage them into a single file, allowing the resultant file to be transported across an open network or to be burnt onto a PC-readable CD-ROM without losing the file's native attributes. When the file is loaded back to its native environment, it will be restored to its original state.

It should be noted that once the new file 23 has been placed on storage Disk B, 22, then by the use of the NX services 50, this new container file 23 can be transmitted to the NT system 30. Thus, the NT system with its hard Disk C,24, can now receive and utilize the new file 25 (as C:\MY\CONTAINER\FILE) which came from the storage Disk B,22.

Another problem aspect involved is when an operator wishes to take a file from a first system, such as an A Series system program and copy it into a UNIX box or an NT box—that information cannot normally be transported because of the format and protocol differences.

Thus, the specialized structure and format of the A Series native files which normally could not be moved across a network, would have to be reconstituted and stored as part of the data in the data file and then made into a regular character data file of a common format such that any operating system can read it. This would be a byte-stream data file which could be read by any platform, whether it be a UNIX box, an IBM box, or a NT box. Thus, resultantly, there is now a file that any platform can read.

In what is called the "Unwrapping" operation, all the files within a container file are recreated into their native forms. All the time-stamped dates are reapplied, all the disk, row, address information is supplied, each file is rewritten row for row, segment for segment, exactly as it looked on the original system. Thus, if there were "spaces" at the end of the segment on the original file, there will also be the same spaces at the end of this segment on the resultant file. This is so because all this information is in the file's Disk File Header.

Thus, what has been accomplished is to take one or more original native files and repackage them into a single, character-oriented file. This container file then can be burnt onto a CD-ROM, so it can be transported anywhere to a second location, and then be loaded and unwrapped on the first platform (Unisys A-Series) to act like the original files.

One method of getting system software out from the originator to a customer is on a Compact Disk, that is a CD-ROM, which has specially formatted arrangements in order to transmit Unisys A Series software. However, these files often are not always an industry standard format.

Customers often ask saying that they have a Compact Disk writer on their PC and they want to know—"how do I format a file so that I can distribute software to my other terminal" or to other customers that they have in their area?

Thus, the present system allows these recipients to download these containers to their personal computer and then burn them into a Compact Disk and send them to their local co-workers or to their other customers. The burned-in files on the Compact Disk are burned using Industry Standard format for compatibility to other systems platforms, such as NT system platforms, UNIX system platforms, IBM system platforms, DEC System platforms and Unisys A Series system platforms.

Thus, the present system operates such that operators using the A Series systems can unwrap their files directly from an industry compatible Compact Disk, so that the file is usable just by putting the Compact Disk into the A Series system and giving it the command to "Unwrap Files". The files and software can then be received for utilization.

The present system requires the packaging of native container files of a first computer system such as a Unisys A Series system, in such a way as to allow them to co-exist on the same CD-ROM media, as non-native container files. This packaging of container files also allows for the transport of the native (A Series) files across heterogeneous networks, while still maintaining information on their native (A Series) attributes.

Previously CD-ROM's contained native A Series software on CD disks which were burned from a library maintenance formatted tape. However, this limited these types of files to only be useful for native A Series systems which are formatted for native A Series files. The present system provides an expanded ability for burning the native A Series files of software for a first computer system onto CD-ROM disks which will be compatible with suitable files for a second computer system, such an a Microsoft NT system and other platforms.

The native formatting of A Series files had attributes such as FILEKIND, CREATIONDATE, and RELEASEID, which now need to be placed in a format capable of being stored on a disk media which is using an industry-standard file format.

As mentioned earlier, "wrapping" is a term used to define the process of packaging a native A Series file (first computer system) along with its Disk File Header information, (plus either a checksum, or optionally a digital signature), as a byte-stream data file (FILESTRUCTURE=STREAM, MAXRECSIZE=1, FRAMESIZE =8) So that it can be transported across heterogeneous networks and non-A Series specific media, while still maintaining its native A Series attributes.

The "digital signature" is created using an industry-standard public key/private key digital signaturing algorithm (DSA) which provides a measure of security in that it provides a user confidence as to where the file originated from. The present system encompasses the Master Control Program (MCP), the Work Flow Language (WFL) program, and the FILEDATA work necessary to wrap container files by packaging them into new, byte-stream files (wrapping) and later restoring them to their original native A Series format when needed for A Series systems (Unwrapping).

NEW WFL SYNTAX: This involves a new work flow language syntax, so that arrangements are made in the WFL compiler 15 to support the new syntax which will have some similarity to a previous Library Maintenance MOVE command. The now syntax allows a User to wrap either a single file, a list of files, or a directory of files, in addition to subsequently enabling the unwrapping of these files, by specifying both the input file and the output file, or the directory title and location.

ADDED FIRST PROGRAMMATIC INTERFACES 36 (MCP_FILEWRAPPER): A programmatic interface is provided that will allow the User-Caller to pass native A series files' titles and location as "Input" along with an "Output" file, title and location. The "Output" file seen in FIG. 3B, will be a "byte-stream" file with a beginning data block containing (i) an identification stream; (ii) directory location within the file; (iii) container option information and container checksum; (iv) one or more wrapped files; (v) directory identification streams (vi) directory of wrapped files within the container; and (vii) an ending block containing an optional digital signature..

Thus, the added programmatic interface 36 allows the caller to pass the byte-stream file's title and location as input, along with an output file title and location if needed, for use of the "unwrapping" process. The "resultant file" will be a native A Series file created with the output file and location, but also containing the data and all of the native A Series attributes of the original file.

SINGLE PROCEDURE CALL: This first programmatic interface 36 will allow input and output directory names to be passed in order to wrap or unwrap a directory of files with a single procedural call. This also allows for a single output "container file" to be created from multiple input files.

SECOND PROGRAMMATIC INTERFACE 38 (MCP_WRAPPER): This interface is created to allow a caller to pass the A Series file's title and location as "input", together with an "output" procedure. The data returned to the caller's output procedure will be a stream of data FIG. 3A with (i) a beginning data block containing an identification string; (ii) options chosen; (iii) the original file's Disk File Header information; (iv) the file itself as byte-stream data; and (v) an ending block containing a checksum; (vi) a digital signature.

Functionally, the second programmatic interface 38 will also allow the caller to pass an input procedure, along with the title and location of an output file. The data passed to the input procedure here would consist of a stream of data, FIG. 3A with a beginning data block containing the identification string, the original file's Disk File Header (DFH) information, the file itself as "byte-stream data", and also an ending block containing the checksum and optionally the digital signature, which is basically the same information that was passed to the output procedure when the container file was originally wrapped. Here, the "resultant file" will be a native A Series file created with the output file title and location, but containing the data and all of the native A Series attributes of the original file.

NEW FILEDATA SYNTAX: New syntax has been added to the FILEDATA LFILE command in order to specify that the file being interrogated is actually a WRAPPEDDATA file. If this is a WRAPPEDDATA file, then FILEDATA will report the "attributes" of the native A Series file "contained within" the wrapped data file, rather than the attributes of the "wrapped" data file itself.

If this is a CONTAINERDATA file, the FILEDATA will report the attributes of all of the Native A-Series files contained within the CONTAINERDATA file, rather than on the "container" file itself.

WFL WRAP COMMAND: This is the Work Flow Language wrap command usable in a first system computer such as the Unisys A Series computer system which can be executed to initiate the action of taking specialized formatted native A Series files and turning them into byte-stream files which can later be burned onto CD-ROM disks. Thus, the software files of a first computer platform, such as the Unisys A Series system, can now be made able to co-exist on the same data CD-ROM's as other types of software which is not A Series software.

KEYSFILES: The system will provide the use of an A Series KEYSFILE which will also be wrapped using the new WFL syntax. This resulting file will also be burned onto the CD-ROM. Normally, the Unisys A Series KEYSFILES are shipped on separate tapes from the rest of the software releases, so that in the present situation, the newly wrapped KEYSFILE will be shipped on a separate data CD-ROM separate from the rest of the A Series release software files.

The A Series KEYSFILE is a file on each A Series system used to store License Key information for the individual system in order to determine which of the Unisys licensed features the user has purchased for use on that system.

The now WFL UNWRAP syntax can be used to unwrap the KEYSFILE off of the CD, while copying it into the A Series system. Once the file (as KEYSFILE) has been copied onto the A Series system, then a IK MERGE can be performed. IK MERGE is the system command used to merge the data from the now KEYSFILE (unwrapped from the CD ROM on to Disk) on the A Series system into the system's current KEYSFILE.

DIGITAL SIGNATURE AlGORITHM: The acronym DSA refers to the digital signature algorithm (DSA). The DSA public key and DSA private key are a function of a set of large prime numbers designated P,Q,G, which are generated by the digital signature algorithm. When "signing" a given file, the DSA requires the values of P,Q,G, and their private key to produce a digital signature which consists of two large integers designated R and S. When this message is to be verified, the "verification process" asks for a set of data designated [P,Q,G, PUBLICKEY, R, S].

A user is only concerned with the public and the private key pair. However, since prime numbers P,Q,G,R,S, are inherent and required in the creation and verification of a "digital signature", there must be provided a way to manage them and make their presence essentially transparent to the user. R and S are easy to handle because they are created during the "signing" process of a WRAP operation, so that their values are readily available to be embedded in the WRAPPED container file. The handling of elements P,Q,G, on the other hand, is more complex because their values must be supplied from an "external source", (that is to say, the user), to the WRAPPING function.

Thus questions and decisions arise regarding (i) how should P,Q,G, be generated? (ii) Since the generation process consumes so much resources, how often should P,Q,G, be generated, that is to say, should it be on a per-run basis, on a per-user basis, or otherwise? (iii) Since each binary value occupies an array of 11 words, how would a user handle such large values, since the manual typing of these values would be unnecessarily time-consuming? (iv) Then, what kind of user interface should be provided to accommodate the P,Q,G, public key and private keys? Now would they be handled by the Work Flow Language statements of WRAP and UNWRAP? (v) Should the items P,Q,G, be embedded within the WRAPPED FILES? And if so, would that compromise the security of the file, if the file is intercepted when it is transferred across an open network?

The solution to these types of problems and questions will be delineated in the following paragraphs.

OVERALL PROCESS

For each software Release made, a special Release group will run a special utility that generates the values for P,Q,G, public and private keys. This particular set [ID, software level, public key, P,Q,G] will be stored by the utility as a record of the new KEYSFILE called *SYSTEM/DSAKEYSFILE.

The Release group will use the "private key" during the WRAP process to "sign" all the required system software files for that particular level.

The DSA (Digital Signature Algorithm) KEYSFILE will be distributed to customers in the same manner as the existing SYSTEM/KEYSFILE. Upon receiving the DSAKEYSFILE and the system software, the customer installs the KEYSFILE into the system and starts UNWRAPPING WRAPPED software without the need for specifying a public key.

When a user wants to WRAP his files with the "digital signature option", he must obtain a DSA keypair. Keypairs can be generated by writing a program that calls the MCP, MCP_GENERATEDSAKEYS procedure.

The private key would then be supplied to the WRAPPING routine (for example, through the TASKSTRING) attribute of the WFL_WRAP statement). The public key would be given to the receiver of the files. When these files are to be UNWRAPPED, a correct public key must be provided (for example, via the TASKSTRING attribute of the WFL UNWRAP statement) for the operation to succeed.

HANDLING DSA VALUE DURING WRAP AND UNWRAP:

The WRAPPING routine, upon recognizing that a digital signature is required, obtains the P,Q,G, values from the active DSAKEYSFILE for the System Software Release (SSR) level that the system is currently running on. It then provides these values, along with the user-furnished private key, to the DSA "signing routine". This routine, after signaturing the file, returns two large integers, R and S. These two integers, along with the current SSR level, can be stored within the file (FIG. 3B) by the WRAPPING process.

When this file is UNWRAPPED, the UNWRAPPING routine gets P,Q,G, values from the active DSAKEYSFILE based on the SSR level it extracts from the file. The file's R and S values, along with P,Q,G, and the user-supplied public key, are then passed to the DSA "signature verification routine". If there is no user-supplied public key (an is often the case of System Software WRAPPED by the Release group), then the public key from the active DSAKEYSFILE is used.

CHECKSUM: A checksum is calculated for the Disk File Header (DFH) for every file as it in wrapped. This ensures that there is no unintentional corruption of the Disk File Header as the file is shipped across a network. It also provides the receiver of the file some measure of confidence as to the origin of the file.

In addition to the checksum for the Disk File Header, a checksum is also calculated for the entire context of the file including the Disk File Header (DFH).

SIGNATURE AND CHECKSUM (PREVENTION OF CORRUPTION): The checksum will not normally be sufficient to ensure that a Disk File Header has not been intentionally corrupted, since the checksum algorithm is not protected and is fairly easy to reproduce. There is significant overhead to validate the Disk File Header if there were no protection of the structure, other than the simple checksum. Thus, without any real protection for the Disk File Header, it would be necessary to create an entirely new Disk File Header for the original file, and then separately validate every attribute of the header before it could be considered trustworthy for application.

The Master Control Program (MCP) 10, FIG. 1B, will assume that a Disk File Header is a valid piece of data. However, it is necessary to validate the Disk File Header before the rest of the file has oven been retrieved, since even the information regarding the "size" of the file is stored in the Disk File Header.

In order to insure that there was no intentional corruption while the file was in transit and also provide the "receiver" of the file with some insurance that the sender of the file was indeed that who the receiver expected it to be, a "digital signature" may be requested when the file is wrapped by specifying a "private key" with which to identify the signature file while wrapping. The receiver must specify the file's "public key" in order to verify the file when unwrapping it.

PUBLIC/PRIVATE KEYS FOR SIGNATURING: A KEYS generation utility is provided as a separate utility to generate public/private key pairs to be used when signing files. Public/Private key pairs are generated using the new utility in order to be used by the wrapping interfaces for signaturing files. Users who wish to create their own utility can write a program to interface with the MCP procedure MCP_GENERATEDSAKEYS.

Figures 1, 2A:
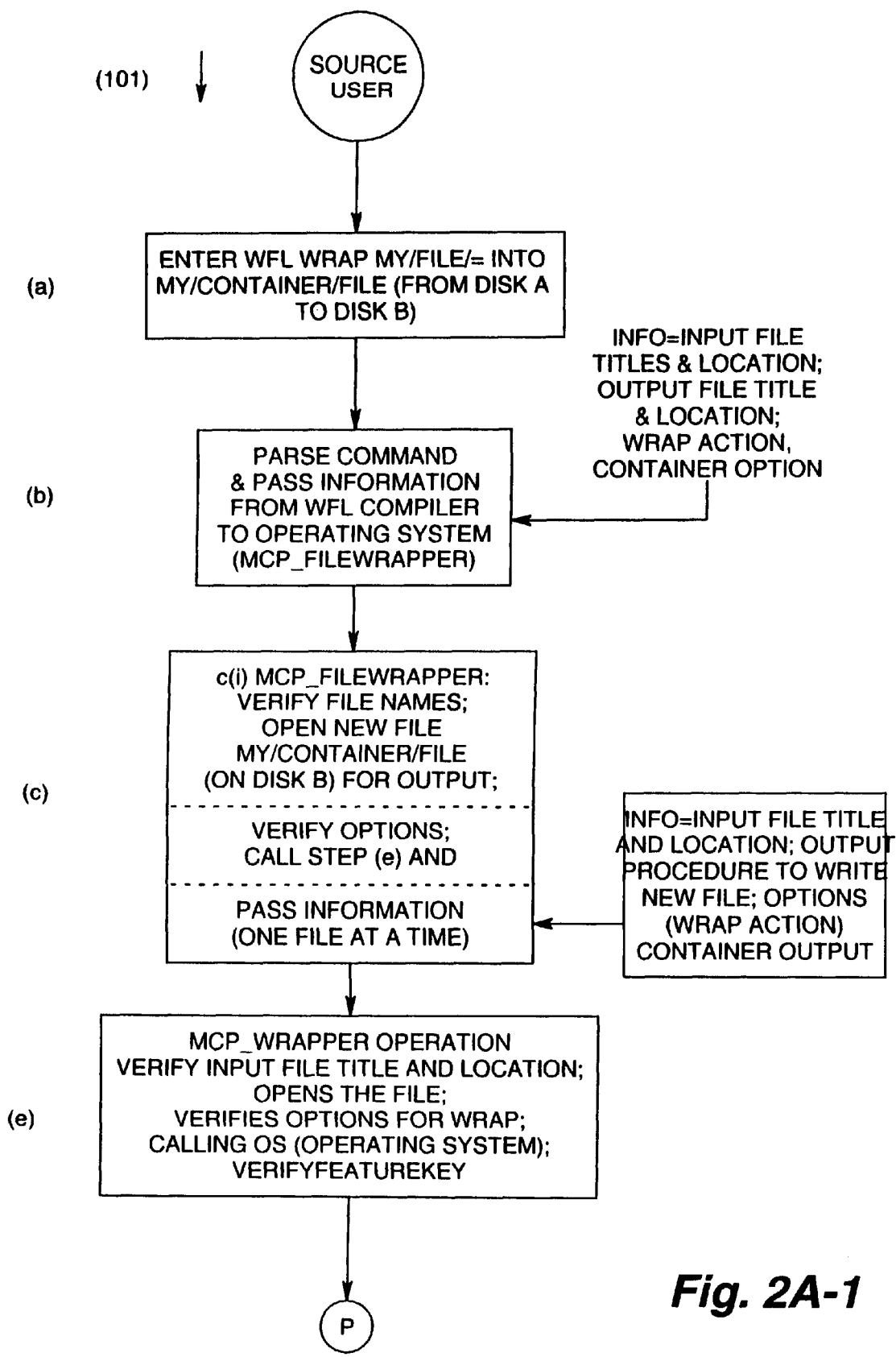
FIGS. 2A (-1,-2,-3,-4) and 2B are flow charts indicating the system of steps involved for burning a CD-ROM with the data in a generalized protocol format suitable for Internet transmission and for compatibility with MT or other platforms.
Figures 2, 2A:
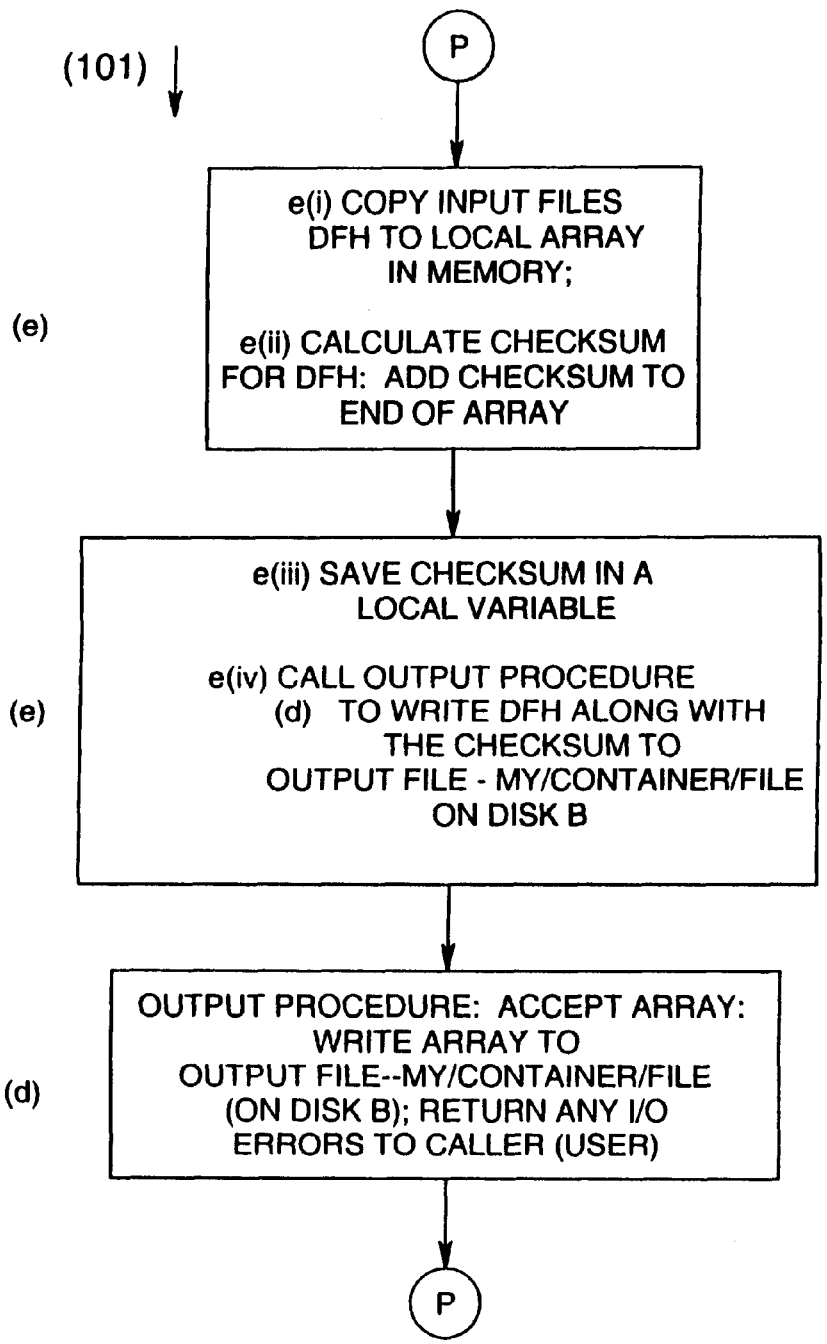
Figures 2, 2A, 3:
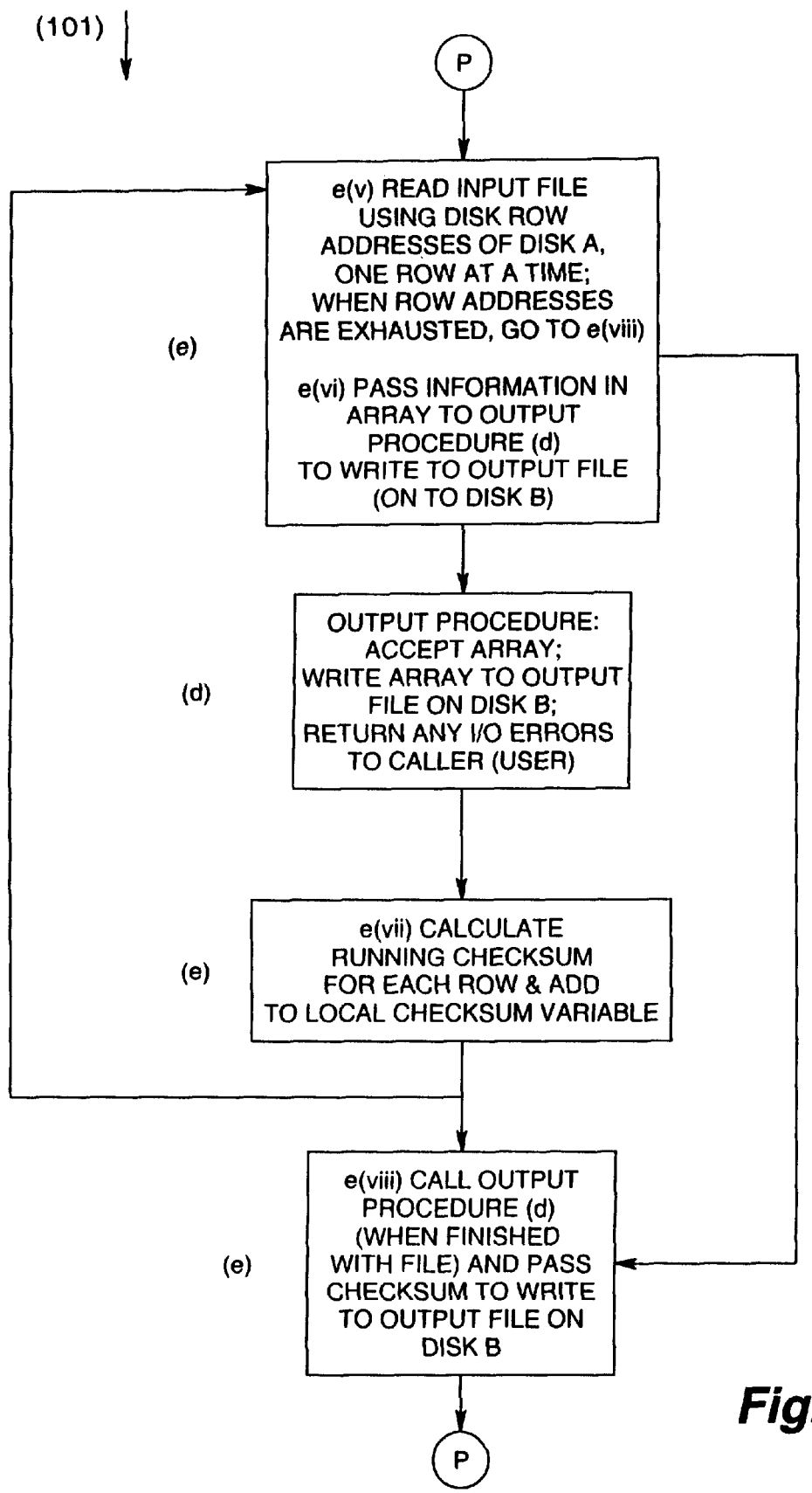

WRAPPEDDATA FILE FORMAT: With reference to FIG. 3A, there will be seen the format of the WRAPPEDDATA FILE which will be a simple byte-stream file. This file, as seen in FIG. 3A, will contain several sections. The first section (i) is the word UNISYS "000010" (Source Co ID) which will be "EBCDIC" data used to indicate that this is likely to be a Wrapped file. The number associated with this identifier may be changed if the format of this file is changed.

The second block (ii) labeled "options" contains the options used when wrapping the file, such as the identifier to be used to locate the "public key" information in order to verify a file containing a digital signature.

The third block of FIG. 3A is (iii) designated as the Disk File Header, which involves a copy of the actual A Series Disk File Header for the file. This will become the actual Disk File Header for the file when it is restored to its native format after a "Unwrap" operation. Additionally in block (iii), there is seen the Header checksum, which is a separate checksum for the Disk File Header itself.

The fourth block (iv) of FIG. 3A indicates "the file" which involves the contents of the file itself, written as byte-stream data.

The fifth block (v) of FIG. 3A, is designated an "checksum", which will be a single word of 48 bits calculated for the file and the disk file header combined, using a private key from a public/private key pair.

The sixth section (vi) shows the digital signature as being composed of Section R and Section S. The Section R includes 11 words or a total of 528 bits. Likewise, the Section S includes 11 words of a total of 528 bits. This constitutes the digital signature portion of the transmitted file which has been wrapped.

DSAKEYSFILE FILE FORMAT: The now system involves a keys file called "SYSTEM/DSAKEYSFILE". This file is stored and managed similarly to the manner of existence on earlier A Series systems which used the "SYSTEM/KEYSFILE". This file is used to store records of ID, software level, public key, and integers P,Q,G. These involve the following:

(i) ID: This is a unique and meaningful EBCDIC string with a length of up to 17 characters which is used for external display and for identifying the set.

(ii) Software Level: This is a real number that identifies the software level involved.

(iii) Public Key: This is a system DSA key generated along with a system private key based on certain prime numbers designated P, Q, G. This key is subsequently used in the "Unwrap" process of the A Series software.

(iv) P,Q,G: These are prime numbers generated by a special utility. For a given set of (P,Q,G), there are a variety of public and private key pairs which can be generated.

The DSAKEYSFILE is an unblocked file which consists of records whose maximum record size is 60 words in length. The general information record contains miscellaneous data about the file, for example, version, number of search table records, number of key entries, etc. This record is then followed by one or more search table records which in turn, contain a number of four word search entries. Following the search table records are the data records with each containing a different sot of [ID, software, public key, P,Q,G].

The main purpose of the DSAKEYSFILE is to store the P,Q,G primes used when creating public and private key pairs. It is also used to store system public keys which are normally about 60 characters long, so the caller of Unwrap does not need to enter this character string every time when the caller unwraps Unisys' signed software.

This procedure involves a further procedure entitled "GET_DSA_PQGKEY" which obtains the corresponding set of [P,Q,G, system public key] from the active DSAKEYSFILE based on the SSR level and returns the set to the caller.

INTERFACE OPERATIONS: This system involves new work flow language (WFL commands) designated as WRAP and UNWRAP which are provided to allow Users a simple method of invoking the new interfaces of this system.

There are two new FILEKIND values created to identify the files of the new format. These will help to prevent users from accidentally using the WRAP syntax to act on a file that has already previously been wrapped.

There is basically now provided two new programmatic interfaces designated as (i) MCP_FILEWRAPPER 36 and also (ii) MCP_WRAPPER 38. These programmatic interfaces are exported out of the Master Control Program (MCP) 10.

FILEKIND: This involves a set of values which will aid in identifying files that have been "wrapped" as long as the files have never left the environment of the first computer system, that is to say, the A Series computer. Once the file has then been copied into a non-A Series system, and then back on to the A Series system, this information is lost. The main purpose of new FILEKIND value is to ensure that a user does not accidentally attempt to WRAP an already WRAPPED file, as would be the case if a WFL WRAP command was executed on a directory of files and then the system did a Halt/Load before all of the files of a directory were wrapped. If the job were to restart after the Halt/Load, the WRAP command would begin to act on the directory over from the very beginning. If a file is encountered with a FILEKIND or with a WRAPPEDDATA value, that file will be skipped, and an error message will be issued for the file indicating that the file had already been previously wrapped.

WORK FLOW LANGUAGE (WFL): The Work Flow Language syntax is provided to allow a user easy access to the new programmatic interfaces. The new WFL commands permit the user to access the now interfaces to institute a wrap or an unwrap action without having to know the layout of the interfaces or having to create a program to call up these interfaces.

TASKSTRING: This is a data structure that contains private or public key information for either signaturing or for verifying the signature of the file. Thus, for a "Unwrap" operation, the TASKSTRING will be used to specify the public key that should be used to verify the signature that was calculated when the file was wrapped. Then conversely, for the WRAP operation, the TASKSTRING is used to specify the "private key" that should be used to calculate the signature of the file.

MCP?FILEWRAPPER INTERFACE: The newly developed MCP_FILEWRAPPER program is used for Work Flow Language support and User programs. A User can call this program specifying either a "Wrap" or an "Unwrap" action along with the title and the location of both the input files and the output files. Of course, the input file specified for a "Wrap" operation must not have a FILEKIND of WRAPPEDDATA. Further, the caller must have the proper privilege for both the input and the output files or directories.

The MCP_FILEWRAPPER program involves procedures which return errors. These errors are returned as display messages if the procedure is called from the Work Flow Language (WFL). MCP_WRAPPER INTERFACE: When this interface program is called to "Wrap" a file, it takes a standard form name for an existing A Series file, along with an output, or Write, procedure. The A Series files Disk File Header (DFH) will be checksum passed the output procedure as data along with the checksum. Then the file itself will be read and passed on to the output procedure as data. Finally, there will be provided (optionally) a calculated digital signature or a checksum for the entire file which will be passed to the output procedure as data.

When the MCP_WRAPPER program 38 copies a file from disk (i.e. "Wraps" the file), it updates the files COPY SOURCE time-stamp in the Disk File Header (DFH) of the A Series file that has been wrapped.

One of the parameters for the MCP_WRAPPER is the procedure designated IOWRAP. IOWRAP is the procedure being passed, either as an output or a WRITE procedure for Wrap or an input or READ procedure for the Unwrap. The parameters for IOWRAP involve (i) LGTH which indicates the length array data in bytes; (ii) DATA is the array containing the data to be written when WRITE for wrapping or READ for unwrapping.

It is significant to note that a Disk File Header (DFH) can involve data up to about 20,000 words long. Thus, the IOWRAP parameter procedure must be able to handle at least 20,000 words in the data array in one call.

A CONTAINERDATA FILE: This will be a simple byte stream file of the Format shown in FIG. 3B with sections designate (i) to (vii). Section (i) is the <Container ID> which is EBCDIC data used to indicate that this is a Container File. For example, this identifier can be designated as MCP_FILEWRAPPER 442. This identifier could be subject to change if the format or contents of the file changes.

Section (ii) <Directory Location> is a 6 character index to the location of the directory of this container. Section (iii) labeled "Container Option words, etc., and Container Checksum" contains the options used when wrapping the container such as an identifier to be used to locate the "public Key" information in order to verify a container with a digital signature.

Section (iv) <The Wrapped Files>(also see FIG. 3C) are the wrapped files themselves. This is the data returned by the I/O_WRAP call back procedure in the MCP_WRAPPER program 38 for each file placed into the container.

Section (v) <Directory ID> is EBCDIC data used to identify the directory in a container file. For example, this identifier could be "DIRECTORY 442" and could be changed if the format or contents of the directory changes.

Section (vi) Directory of file names and locations, is the directory for all of the files in the container. The directory contains the standard form name of each file in the container, followed by a six (6) character index to the location of the beginning of the wrapped file itself.

Section (vii) is the optional area for a digital signature, R.S.

After a preliminary discussion of the Digital Signal Algorithm, (DSA utility) then subsequently the description of FIGS. 4A, 4B, 4C, 4D, 4E and 4F will provide a sequence for WRAPPING a native container file into a text stream data file and generating the signatures which can be used to guarantee reliability of the data.

THE DSA UTILITY: The Digital Signal Algorithm (DSA) utility has a symbol file designated SYMBOL/DSATOOLS. When compiling this symbol file with the compiler option set at "INTERNAL", a non-restricted version of the utility is produced, otherwise, a restricted version of the utility is produced. This latter version only provides the capability to generate DSA public/private key pairs from a DSAKEYSFILE and is intended for general use.

The symbol file for the DSA utility provides certain functionalities which include:
(i) the ability to generate key pairs from a sequential file containing sets of DSA information.
(ii) the ability to create or to add DSA key sets to a DSAKEYSFILE.
(iii) the ability to delete DSA key sets from a DSAKEYSFILE.
(iv) the ability to dump contents of a DSAKEYSFILE into a "sequential file" (regular text file).
(v) the ability to merge a DSAKEYSFILE into the active *SYSTEM/DSAKEYSFILE.
(vi) the ability to copy certain DSA key sets from one DSAKEYSFILE and store them into another KEYSFILE.

Both of the above versions of the code file must be executed under a "privileged" User code.

The restricted version of the DSA utility is designated "OBJECT/DSATOOLS".

A non-restricted version of the DSA utility is designated "OBJECT/DSATOOLS/FULL".

A sequential file containing sets of DSA information is designated, DSAINFO/SOURCE. Currently, this file contains 21 sots of DSA information used to generate system public and private key pairs. Only one set is used per each software release, so that these can last for a considerable period of time.

OVERALL PROCESS: For each Software Release (SSR=System Software Release), the software origination group will do the following steps:

1. Create a DSAKEYSFILE containing a DSA key set for that release, including a system DSA public/private key pair. The DSA public key is part of the DSA key set. The DSA private key is kept on a secret basis.

2. Using the generated DSA private key, the software origination group will signature Unisys system software. This, however, can be omitted if software is burned into Compact Disks (CD'S), since the software on a Compact Disk cannot be tampered with.

3. Distribute the signatured software and the related DSAKEYSFILE to users and customers.

GENERATING A SYSTEM DSA KEY PAIR AND CREATING A DSAKEYSFILE By using a privileged User code, one can execute the following steps:

1. Create a sequential file (for example, DSAINFO442) with at least one of the DSA information sets in the file DSAINFO/SOURCE. Each DSA information set is intended to be used in any one particular Software Release, and the same set should not be used more than once.

For example, in a Command and Edit (CANDE) session, insert the following commands:

MAKE DSAINFO/442SEQ

U ED

]INSERT DSAINFO/SOURCE from line- to line <editKEYID name if necessary, for example, SSR442DSAKEYID>

<edit SSR number, if necessary, for example, 442.>

]END

SAVE

Figure 5:
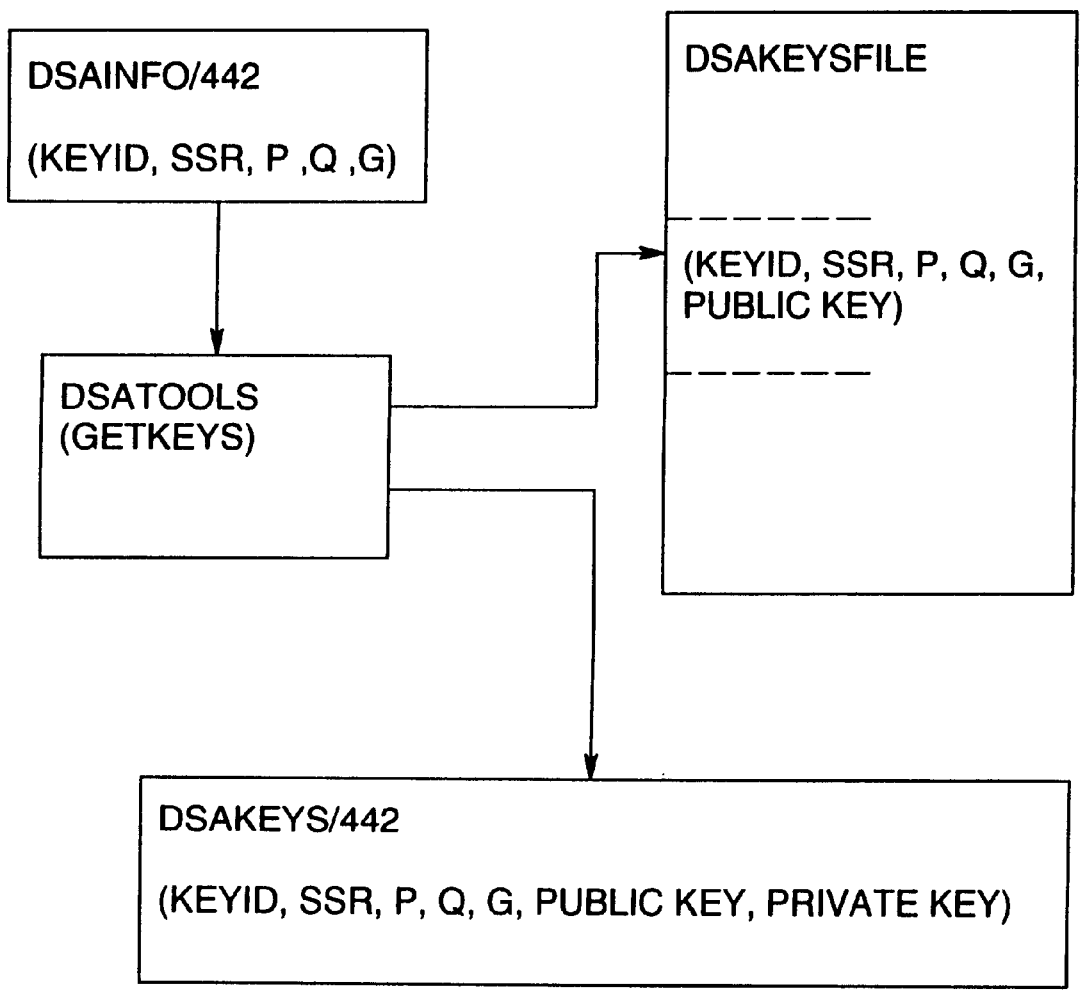
FIG. 5 in a block diagram to show the creating of a DSAKEYSFILE.

FIG. 5 is a diagram illustrating how the digital signature algorithm information, together with the key ID is inserted into the DSATOOLS, which feeds one Output to the DSAKEYSFILE, and another output to the DSAKEYS/442. This results in the creation of the DSAKEYSFILE, having a public key and a DSAKEYS/442 unit which combines the public key and the private key.

SIGNATURING SYSTEM SOFTWARE USING DSA PRIVATE KEY:

1. Assuming that the system in running on a System Software Release designated 44.2, the method in now ready to signature the files. If the system is not ready to signature the files, it is necessary to go back to step 1, in the previous section (generating a system DSA key pair) and create a DSA key set in the *SYSTEM/DSAKEYSFILE for the particular level the system is running on.

2. It is necessary to ensure that SIGNATURESUPPORT in SL-ed. If this is not the came, then SL it with *SYSTEM/DIGITAL/SIGNATURE/SUPPORT. "SL" is defined in item 39 of the Glossary an System Library.

For example, at the Operating Display Terminal (ODT), enter the following:

SL SIGNATURESUPPORT *SYSTEM/DIGITAL/SIGNATURE/SUPPORT

3. Ensure that DIGESTSUPPORT is SL-ed. If this is not the case, then SL it with:

*SYSTEM/MESSAGE/DIGEST/SUPPORT

For example, at the operator Display Terminal, enter the following:

SL DIGESTSUPPORT=*SYSTEM/MESSAGE/DIGEST/SUPPORT

4. Now operate to signature the software by using the system DSA private key. Files can be wrapped as separately Wrapped files, or as Containers. The latter, (Containers), allows a number of Wrapped files to be grouped into one single entity. For the software that in to be burned into a Compact Disk (CD), there is no need to signature them since they cannot be altered after they are put into a Compact Disk.

EXAMPLE

Using the NFL WRAP syntax, (to pass the system DSA private key in the task attribute TASKSTRING), a Work Flow Language (WFL) job can then be created to automate the wrapping process.

In a Command and Edit (CANDE) session, enter the following:
WFL WRAP AFILE AS WRAPPED/AFILE;TASKSTRING=<system DSA private key>
WFL WRAP ADIR/=INTO CONTAINERA; TASKSTRING- <system DSA private key>

It should be noted that the files can also be wrapped and signatured using a programmatic interface to the MCP-exported entry point MCP_FILEWRAPPER, 36.

WRAP AND SIGNATURE FILE: FIG. 6 in an illustration of wrapping and signaturing a file. Here, it in seen that the wrapping sequence receives information from the DSAKEYSFILE. It also receives an input from the system DSA private key, in addition to receiving the file information, after which the wrapping sequence will produce the signatured file.

5. To make sure that wrapped files are signatured correctly, it is desirable to verify these files before shipping them out to customers over the Internet, or via the CD-ROM.

EXAMPLES UTILIZING THE UNWRAPPING SEQUENCE FOR SYSTEM SOFTWARE THAT WAS SIGNED WITH A SYSTEM DSA PRIVATE KEY:

Using the WFL UNWRAP syntax, do not pass any string in the TASKSTRING attribute. The system will pick-up the corresponding system DSA public key in the file *SYSTEM/DSAKEYSFILE for verification. This step can also be incorporated into the same Work Flow Language (WFL) job that also WRAPS files, enter:

WFL UNWRAP WRAPPED/FILE AS UNWRAPPED/AFILE WFL UNWRAP*=AS UNWRAPPED/= OUTOF CONTAINERA

As seen in FIG. 7, the UNWRAP sequence is fed information from the DSAKEYSFILE, and also fed by the signatured FILE in order to then produce the original native file which is compatible for the first original computer system which uses the Master Control Program.

DISTRIBUTION: The distribution of the signatured files and the DSAKEYSFILE is done using the ordinary procedures for shipment which can be done via Internet transfer or by CD-ROM.

USING DIGITAL SIGNATURES WITH WRAPPED FILES AM UPPED

With the advent of the WRAP/UNWRAP feature, the present system also gives users the ability to optionally sign wrapped files and wrapped containers with digital signatures. Like a normal signature on a real piece of paper, a digital signature allows the recipient of a singed wrapped file to be certain of its origin. Unlike a normal signature, the digital signature is electronically represented as binary data rather than handwritten characters. This allows the signature to be "embedded" within the file, and it enables the system to do some special calculations in order to authenticate the signature and verify that the file has not been tampered with or altered during its transmission.

Digital signature "creation" is based on the data within a file and a private key. Similarly, digital signature "authentication" is based on the same data of the file and a corresponding public key. The private key and public key are generated as a pair by the system, so even though they are not the same, they still share some underlying common mathematical properties. BY differentiating the public key and the private key of a key pair, one cannot use either key for both signing and verification. Thus, a person possessing only a "public key", though is capable of "authenticating" a wrapped file's digital signature "created" by a corresponding "private key", but cannot use it to produce the same signature. On the other hand, a person with only the private key will not be able to verify the signed wrapped file.

The digital signature algorithm (DSA) also ensures that a public key belonging to one key pair cannot be used to validate the digital signature derived from a private key of another key pair.

Since the DSA is not an encryption algorithm, signing a wrapped file or wrapped container does not scramble its data. Instead the DSA makes a pass through the data stream and applies the specified private key to come up with a checksum-like binary hash pattern which is then inserted into the resulting file.

When creating a wrapped file or wrapped container with digital signature, the originator would perform the following steps:

Obtain a DSA key pair that consists of a public key and a private key;

Specify the private key in the wrapping process to create a digitally signed wrapped file or container;

Send the signed wrapped file to its intended recipient;

Send the public key to the same recipient.

The last two steps should get executed separately to make the file more secure. If both the signed wrapped file and the public key are transmitted in the same message, it may be possible for some unauthorized party to intercept the message, unwrap and modify the file, then sign it with their own private key, and forward, to the unsuspecting recipient, the altered signed wrapped file and a different public key.

Upon receiving a signed wrapped file or container, the recipient of the file would perform the following steps:

Obtain the corresponding public key;

Specify the public key in the unwrapping process. If the system does not attempt to authenticate the file's digital signature or fails to do so, the signed wrapped file is either corrupted or was modified and should not be trusted.

The following sections describe in detail what a customer should do to unwrap the signed wrapped files and containers (such as ICS), and how one can wrap and unwrap one's own files with digital signatures.

GETTING STARTED: New System Libraries; There are two new System Library files that need to be installed and SL'ed (Glossary, item 39) on the system before one can utilize the digital signature feature. These are SYSTEM/DIGITAL/SIGNATURE/SUPPORT and SYSTEM/MESSAGE/DIGEST/ SUPPORT. These files are shipped with software releases beginning with HMP NX3.0/SSR44.2. If these files are not currently available on the system, they may be obtained by ordering the SECURITY Interim correction (IC) for releases beginning with SSR 42.3. From the ODT, (Operator Display Terminal) install these files as follows:

SL SIGNATURESUPPORT=*SYSTEM/DIGITAL/SIGNATURE/SUPPORT

SL DIGESTSUPPORT=*SYSTEM/MESSAGE/DIGEST/SUPPORT

NEW DSA KEYSFILE: A customer also needs to obtain a copy of the SYSTEM/DSAKEYSFILE. This keysfile contains one or more DSA information "sets" where each corresponds to a particular SSR (System Software Release). One can only wrap and unwrap files with digital signatures for the levels indicated in the DSA keysfile. If the *SYSTEM/DSAKEYSFILE already exists on the Halt/Load family, the available levels can be shown by entering the ODT (Operator Display Terminal) command: IK DSASHOW Beginning with EMP NX4.0/SSR45.1, the DSA keysfile. is shipped with standard software releases. For earlier releases, a customer needs to call the support organization to obtain a copy of this file. This file will be delivered through the same process as *SYSTEM/KEYSFILE because wrapping the DSA keysfile could compromise Unisys' digital signature security mechanism.

The DSA keysfile is cumulative, that is—a DSA keysfile of a later SSR release will contain the DSA information set of that release plus all DSA information sets of earlier releases [Note: All supported software levels earlier than BSR 44.2 will use the 44.2 DSA information set.] Thus, installing a DSA keysfile is as simple as copying the most current DSA keysfile to one's Halt/Load family. However, only the DSA keysfile with the name *SYSTEM/DSAKEYSFILE will be recognized by the system as the active system DSA keysfile. To install a DSA keysfile as the active DSA keysfile, the following command is used:

COPY<DSA keysfile filename>AS *SYSTEM/DSAKEYSFILE To<Halt/Load Pack>(PACK)

SIGNING AND VERIFYING ONE'S OWN FILE:

Obtaining One's Own Public/Private Key Pairs: In order to add a digital signature to one's own files during the wrapping process, one mist first obtain a public/private key pair. Generating key pairs involves writing a program that interfaces with the new MCP procedure MCP__GENERATEDSAKEYS. One may want to use the sample program listed at the end of this document (SAMPLE PROGRAM TO GENERATE DSAKEYPAIRS) to help one get the key pairs, or one may want to modify it to suit one's own needs. SSR=System Software Release.

Note that key pairs are generated based on an SSR level. This means one cannot use a private key of one SSR level to digitally sign wrapped files for another SSR level. SSR=System Software Release.

Creating Digitally Signed Wrapped Files: Once a key pair is generated, one can use the WFL WRAP syntax to create a digitally signed wrapped file. By passing the private key through the task attribute TASKSTRING of the WRAP statement, one indicates the desire to add a digital signature to the file.

By default, the system will produce the signed container for the current software level. At times, one may want to create a digitally signed wrapped file for an BSR level different than that of the running system (for example, the recipient of the file may not be on the same SSR level as the operator). For such situations, one will need to specify the targeted SSR level for the WRAP statement through the task attribute TARGET. The level value should be represented as a whole number without the decimal point.

Distributing and Verifying Digitally Signed Wrapped Files: One can now send the signed wrapped files to intended users. In order for these files to be verified and unwrapped, one also needs to send the corresponding public key to them. To ensure the wrapped files are not compromised in transit, one should avoid sending both signed files and public key at the same time. For instance, if using *-mail as the delivery mechanism, send the public keys in a separate mail message from the wrapped files they are protecting. If files are to be transferred over the Internet, one can allow the wrapped files themselves to be down loaded, but simply display the public key for the recipient to "cut and paste" into the WFL WRAP statement, or offer to send the public key to the recipient via a provided e-mail address.

Recipients of the signed files would use the SFL UNWRAP syntax to verify and unwrap files, passing the public key one had provided through TASKSTRING.

Dealing with Digital Signatures:

One should not release one's private key because it may compromise the signed wrapped file's security.

Because both public and private keys are long hex strings, when one needs to execute many WRAP and UNWRAP statements dealing with digital signatures, it may be better for one to create a WFL job and associate the key values with string variables. For instance,
STRING PUBLICKEY,PRIVATEKEY;
PUBLICKEY:="<hex string for DSA public key>";
PRIVATEKEY:="<hex string for DSA private key>";
WRAP MYDIR/=INTO MYCONTAINER;TASKSTRTNG=PRIVATEKEY;
UNWRAP=OUTOF YOURCONTAINER;TASKSTRING=PUBLICKEY;

Since wrapping files with digital signatures is processor-intensive, one should generally avoid creating many separate signed wrapped files. One may want to put them into one single signed container instead.

One should not trust files that are supposedly wrapped with digital signatures under conditions when the system does not either attempt to verify the signature or fails to do so.

SAMPLE PROGRAM TO GENERATE DSA KEY PAIRS:

BEGIN

This sample program demonstrates the basic technique on how to generate DSA key pairs based on a specified SSR level. The resulting public and private key pairs then can be used in the WFL WRAP/UNWRAP statements to sign and verify signatured wrapped files.

```
    FILE DSAKEYS  (KIND=DISK, MAXRECSIZE=14, MINRECSIZE=14,
                  BLOCKSIZE=420, BLOCKSTRUCTURE=FIXED,
FILEKIND=DATA,
                  FRAMESIZE=48, NEWFILE=TRUE);
    LIBRARY MCP (LIBACCESS=BYFUNCTION,
FUNCTIONNAME="MCPSUPPORT.");
    REAL PROCEDURE MCP_GENERATEDSAKEYS (SOFTLEVEL,
NUMOFPAIRS, ARY,
                                         PROC, OPT);
        VALUE      SOFTLEVEL, NUMOFPAIRS, OPT;
        REAL       SOFTLEVEL, NUMOFPAIRS, OPT;
        ARRAY      ARY [0];
        REAL       PROCEDURE PROC (INX, PUBKEY, PRIKEY);
                   VALUE INX;
                   REAL INX;
                   ARRAY PUBKEY, PRIKEY [0]; FORMAL;
        LIBRARY    MCP;
    REAL PROCEDURE WRITEKEYPAIR (PAIRNUM, PUBKEY, PRIKEY);
    VALUE      PAIRNUM;
    REAL       PAIRNUM;
    ARRAY      PUBKEY, PRIKEY[0];
    BEGIN
        ARRAY      BUFF [0:13];
        DEFINE     WRITEIT    =
                   BEGIN
                       WRITE(DSAKEYS, 14, BUFF);
                       REPLACE POINTER(BUFF) BY "  " FOR 14
WORDS;
                   END #,
                WRITEHEXSTR (PREFIX, ARY, INX, LEN) =
                   BEGIN
                       REPLACE POINTER(BUFF) BY PREFIX,
                           POINTER(ARY[INX],4) FOR LEN WITH
HEXTOEBCDIC;
                       WRITEIT;
                   END #;
        % Notify user about the progress. Useful if
USEUSERPROCF is set.
        DISPLAY ("Key pair #" ! ! STRING(PAIRNUM,*) ! ! "
generated.");
        % Keep key pair information secret. Write it out to
file.
        REPLACE POINTER(BUFF) BY "KEY PAIR #", PAIRNUM FOR
* DIGITS, ":";
        WRITEIT;
        WRITEHEXSTR ("      PublicKey = ", PUBKEY, 0, 48);
        WRITEHEXSTR ("                  ", PUBKEY, 4, 48);
        WRITEHEXSTR ("                  ", PUBKEY, 8, 36);
        WRITEHEXSTR ("      PrivateKey= ", PRIKEY, 0, 48);
        WRITEHEXSTR ("                  ", PRIKEY, 4, 48);
        WRITEHEXSTR ("                  ", PRIKEY, 8, 36);
    END;
    DEFINE     % Returned value
               CODEF     = [15:08] #,
               SCODEF    = [31:16] #,
               % OPT word
               USEUSERARYF    = [01:01] #,
               USEUSERPROCF   = [00:01] #,
               % Others
               NUMRETKEYS     = KEYARY[0].[15:16] #,
               FIRSTKEY       = KEYARY[0].[31:16] #,
               NUMREQKEYS     = 4 #,         % Number of
requested keypairs
               KEYWORDS       = 11 #,        % Words for
each key
               SSRLEVEL       = 442 #;       % SSR Level
44.2
    REAL       R, I;
    ARRAY      KEYARY  [0:(KEYWORDS*2*NUMREQKEYS)],
               PUBKEY  [0:(KEYWORDS-1)],
               PRIKEY  [0:(KEYWORDS-1)];
MAIN PROGRAM
Generate 10 DSA public/private key pairs for SSR level
44.2.
Because both USEUSERARYF and USEUSERPROCF return the same
information, we normally set either flag but not both.
This is just an example to illustrate how both cases
work.
    R := MCP_GENERATEDSAKEYS (SSRLEVEL, NUMREQKEYS,
```

-continued

```
KEYARY, WRITEKEYPAIR,
                                    0 & 1 USEUSERARYF & 1
USEUSERPROCF);
    IF BOOLEAN (R) THEN
        DISPLAY ("DSA key generation Error #" ! !
STRING(R.CODEF,*) ! !
                " - SubCode #" ! ! STRING(R.SCODEF,*));
If USEUSERARYF is set, process the returned info.
    IF (NUMRETKEYS GTR 0) THEN          % Got some good key
pairs
      BEGIN
          FOR I:=1 STEP 1 UNTIL NUMRETKEYS DO
              BEGIN
                  R := ((I−1) * 2 * KEYWORDS) + FIRSTKEY;
                  REPLACE POINTER(PUBKEY) BY
POINTER(KEYARY[R])
                                            FOR KEYWORDS
WORDS;
                  REPLACE POINTER(PRIKEY) BY
POINTER(KEYARY[R+KEYWORDS])
                                            FOR KEYWORDS
WORDS;
                  WRITEKEYPAIR (I, PUBKEY, PRIKEY);
              END;
      END;
    LOCK (DSAKEYS);
END.
```

SEQUENCE FOR SIGNING AND WRAPPING CONTAINER FILES:

The overall process of signing and wrapping container files is illustrated by the flowchart in FIG. 4A, which is then amplified via FIGS. 4B through 4F.

At step A1, FIG. 4A, the user initiates a workflow language (WFL) wrap statement with digital signature for containers by passing a private key. Then at step A3, the workflow language compiler parses the command and asks the operating system (MCP) to initiate the MCP_FIZZWRAPPER program 36 as a separate process.

Concurrently, at step A2, the user initiates the wrapping of containers with a digital signature by invoking the program MCP_FILEWRAPPER 36 through a user program.

Whether initiated through the legs of steps A1, A3 or through the leg step A2, the next sequence operates under the step B1.

At step B1, the MCP_FILEWRAPPER 36 routine is executed with a series of elements as follows:
  (i) file list containing output container names and input file names to be packaged into those containers;
  (ii) private key;
  (iii) optional SSR level. This in illustrated in greater detail by reference to FIG. 4B.

At step B2, the program MCP_FILEWRAPPER 36 exits to the operating system or to the user program which then results in the end of the cycle.

Note that Stop B2 is further delineated in terms of the steps in involved in FIG. 4B.

Now referring to FIG. 4B, there is seen the flowchart showing the operation of the MCP_FILEWRAPPER logic in order to digitally sign and wrap containers.

At step B1, the user will enter MCP_FILEWRAPPER, to initiate the program. Then at step B1a, there are a series of six various sequences which involve (i) a verification of all parameters; (ii) getting the specified level or default system software release level (SSR); (iii) calling and getting the digital signal algorithm P,Q,G key for passing the system software release level in order to insure availability of the DSA keysfile and to get the prime numbers P,Q,G and the system public key which is based on the SSR level; (iv) verifying the specified private keys hexadecimal presentation; (v) verifying the wrap license key; (vi) linking to the signature support library (13, FIG. 1B).

Then at step B1b, the sequence operates to build an internal list that contains a series of entries which are (i) the requested output container named; and (ii) if found, the names of the requested files which are to be included in the specified container.

Then at step B1c, a decision tree is used to determined if the internal list is empty. If the answer is "yes," then at step B1cy, there will be issued a "No Files Wrapped" error message which then precedes to step Bid.

At step B1c, if the answer is "No," then there occurs step B1cn which is the "no" link and here the sequence operates to call the EXTRACTLIST in order to process the files indicated in the internal list. FIG. 4C will subsequently delineate factors involved in implementing the EXTRACTLIST.

Then at step B1d, it is seen that if the MCP_FILEWRAPPER program 36 had encountered any error or was abnormally terminated, then it would be necessary to set the appropriate error code in the return value. At step B1e, there is the completion or exiting of the MCP_FILEWRAPPER program.

FIG. 4C illustrates a flowchart for the EXTRACTLIST logic to digitally sign and wrap containers.

At step C1, there is an entrance to the EXTRACTLIST program.

At step C2, there is a decision tree to query as to whether there is a container name in the internal list. If the answer is "No," then at step C2n, there is an exit for the EXTRACTLIST program. However, if the answer is "Yes," then at step C3 another decision tree occurs to query whether there is an input file name for this container. If the answer to this is "No," then step C3a occurs where the program called the ENDCONTAINER program operates to finish up the current container. The END-CONTAINER program is subsequently shown in FIG. 4F. Continuing with FIG. 4C, from step C3a, the sequence turns to step C3b where the system will increment to the next name in the internal list and then connect back to step C2.

At step C3, which involves a query as to the occurrence of an input file name for the container, if the answer is "Yes," then step C4 occurs which is seen to have six separate substeps.

At step C4, substep (i) shows the opening and creating of an output container file; (ii) then a writing to the container file of the container ID plus emptying the directory address and emptying the option words; at substep (iii) the sequence will make the first DSASIGN call in order to signature the ID "Unisys" (source name) at substep (iv) the signature context will be saved which was returned from the DSASIGN call; at substep (v), there is a saving of the current container file location as the file address for the input file to be processed; at step (vi) there is a calling again of the MCP_WRAPPER program 38 (as per FIG. 4D) in order to sign and wrap data of the input file while passing the input file name and the WRITE_WRAP routine as will be illustrated in FIG. 4E, hereinafter.

At step C5, a decision tree occurs to question whether the MCP_WRAPPER program 38 returns an error or not. If the answer is "No," then at step C5n, the sequence will store the same file address into the internal list for the input file which just got processed, after which step C6 will increment to the next name in the internal list and return to step C3.

At step C5, if the MCP_WRAPPER program does return an error (Yes), then step C5y occurs.

At step C5y, there will be a display of the error message and repositioning of the container file pointer to the saved container location after which there will be a restoration of the processing signature context with the saved signature context.

FIG. 4D is a flowchart illustrating the MCP_WRAPPER logic 38 used to digitally sign and wrap single files. This is shown as a sequence of steps from D1 through D9.

At step D1, there is an initiation of the MCP_WRAPPER program.

At step D2, there are several steps illustrated where substep (i) is the WRAP action of the MCP_WRAPPER program; at substep (ii) the sequence will get an input file from Disk 20; at substep (iii) the sequence will get the input files Disk File Header (DFH); at substep (iv) a check will be made to see if the input file is allowed or permitted to be wrapped.

Then at step D3, a call is made to the program WRITE_WRAP for passing the data buffer containing the wrap version ID and the wrap options (later shown in FIG. 4E), is the WRITE_WRAP sequence.

At step D4, a call is made to the WRITE_WRAP program (as per FIG. 4E) for passing the data buffer containing the input file's Disk File Header.

At step D5, data is read from a disk row of the input file into the data buffer.

At step D6, a call is made to the WRITE_WRAP program (as per FIG. 4E) for passing the data buffer containing the input file's disk row data.

At step D7, a decision tree is utilized to question whether more disk rows are involved for the input file. If the answer is "Yes," then the sequence returns back to step D5. If the answer is "No," then step D8 occurs where a call in made to the WRITE_WRAP program (as per FIG. 4E) and where the last time (no more data to process) indicates no more data to come and there is is a passing of the data buffer containing the calculated running checksum of the input file's data.

Then at step D9, there is a completion and exit of the program MCP_WRAPPER, 38.

FIG. 4E is a flowchart illustrating the WRITE_WRAP logic used to digitally sign and wrap a single file.

Here at step E1, there is an initiation of the program WRITE_WRAP.

At step E2, the WRITE_WRAP program will call the Digital Signature Algorithm signature program (DSASIGN) with the prime numbers P, Q. G, in order to signature data in the pass-in data buffer. DSASIGN will also generate the R and S signatures if this is the last call.

At step E3, a decision tree is indicated to query whether there is more data to be forthcoming.

If there is no more data forthcoming "No," then step E4 operates to add the R and S signature which is generated by the program DSASIGN to the end of the available data in the buffer.

At step E5, there is a writing of the data in the buffer over to the output file, after which at step E6, there is a completion and exit of the WRITE_WRAP program.

FIG. 4F is the program sequence illustrating the END-CONTAINER logic used to sign and wrap containers.

At step F1, there is an initiation of the program designated ENDCONTAINER.

At step F2, a decision tree occurs to determine whether the container is empty or not. If the container is empty (Yes), then step F2y will close and purge the container file which will then cause an exit of the ENDCONTAINER program at step F7.

At step F2, if the container is not empty (No), then step F3 occurs where the program saves the current container file pointer as a container directory address.

At step F4, the program enters the phase designated WRITE_CONTAINERDIRECTORY which involves six substeps. At step F4(i) a call is made to the WRITE_WRAP program (per FIG. 4E) in order to write the directory ID for the containers at substep (ii) the updated internal list is processed and a call is made to the WRITE_WRAP program (as per FIG. 4E) in order to write all file names that have been wrapped successfully and also to write their addresses in the container; at substep (iii) a null byte is put at the end of the container directory; at substep (iv) a call is made on the last DSASIGN sequence on the null byte of the directory in order to calculate the R and S signatures; at substep (v), there will be writing of the R and S signatures at the end of the container file, as per FIG. 3B.

At step F5, there is seen three substeps whereby at step (i) there is the placing of the directory address word and the options words into a local buffer. The options word contain the signature byte, the SSR level and other information; at step F5(i), the sequence then calculates the checksum based on the contents of the local buffer and puts the result in the end of the buffer; at step F5(iii), the container file pointer is repositioned to the directory address location and there is a writing out of the entire local buffer.

At step F6, there is a closing or and a locking up of the container file.

At step F7, there is an ending or completion for exit of the program ENDCONTAINER.

The following indicates a generalized overview of the sequential steps for the method of signaturing and wrapping a container.

Figures 2, 2A, 3, 4:
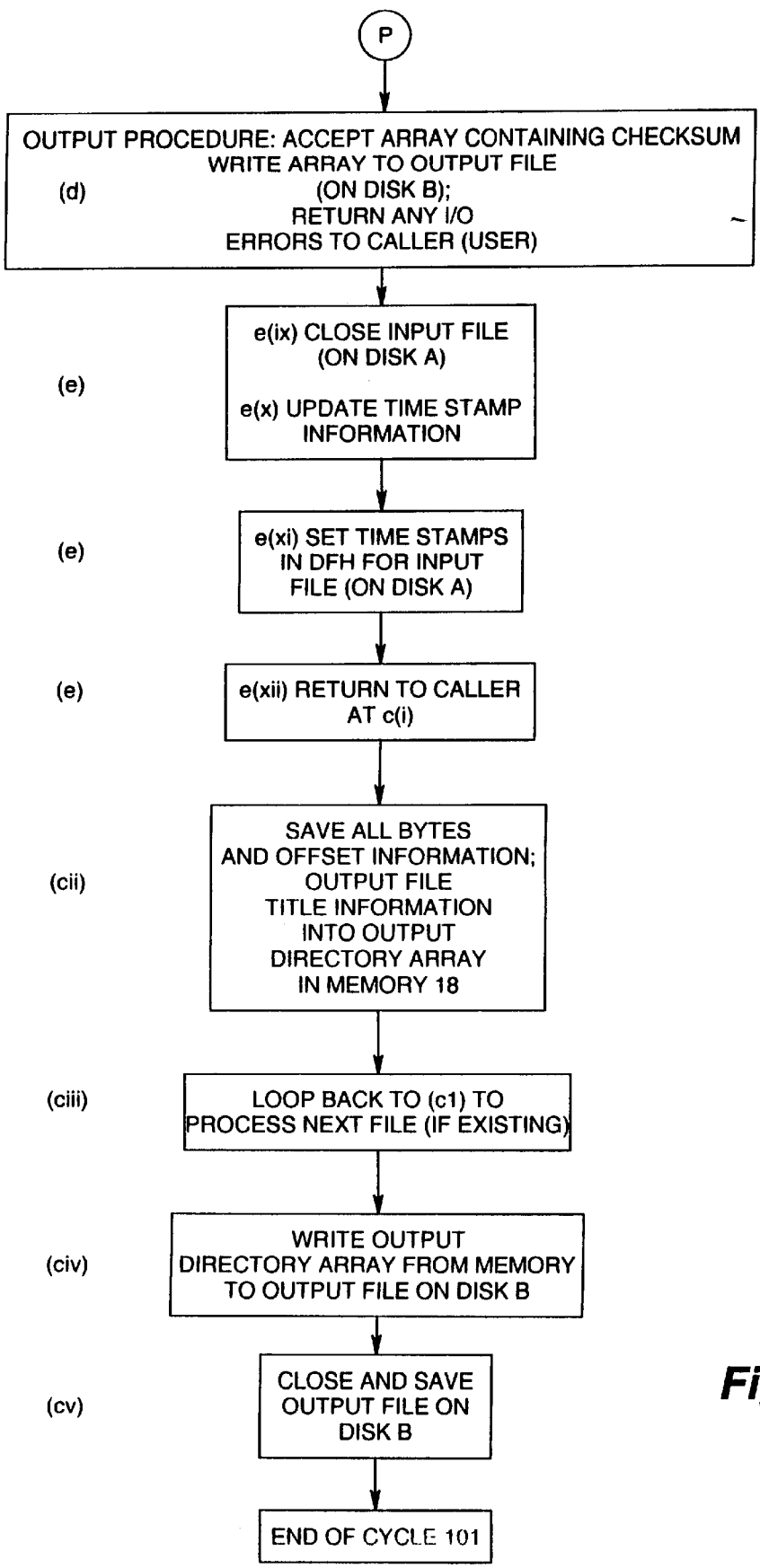
Figure 2B:
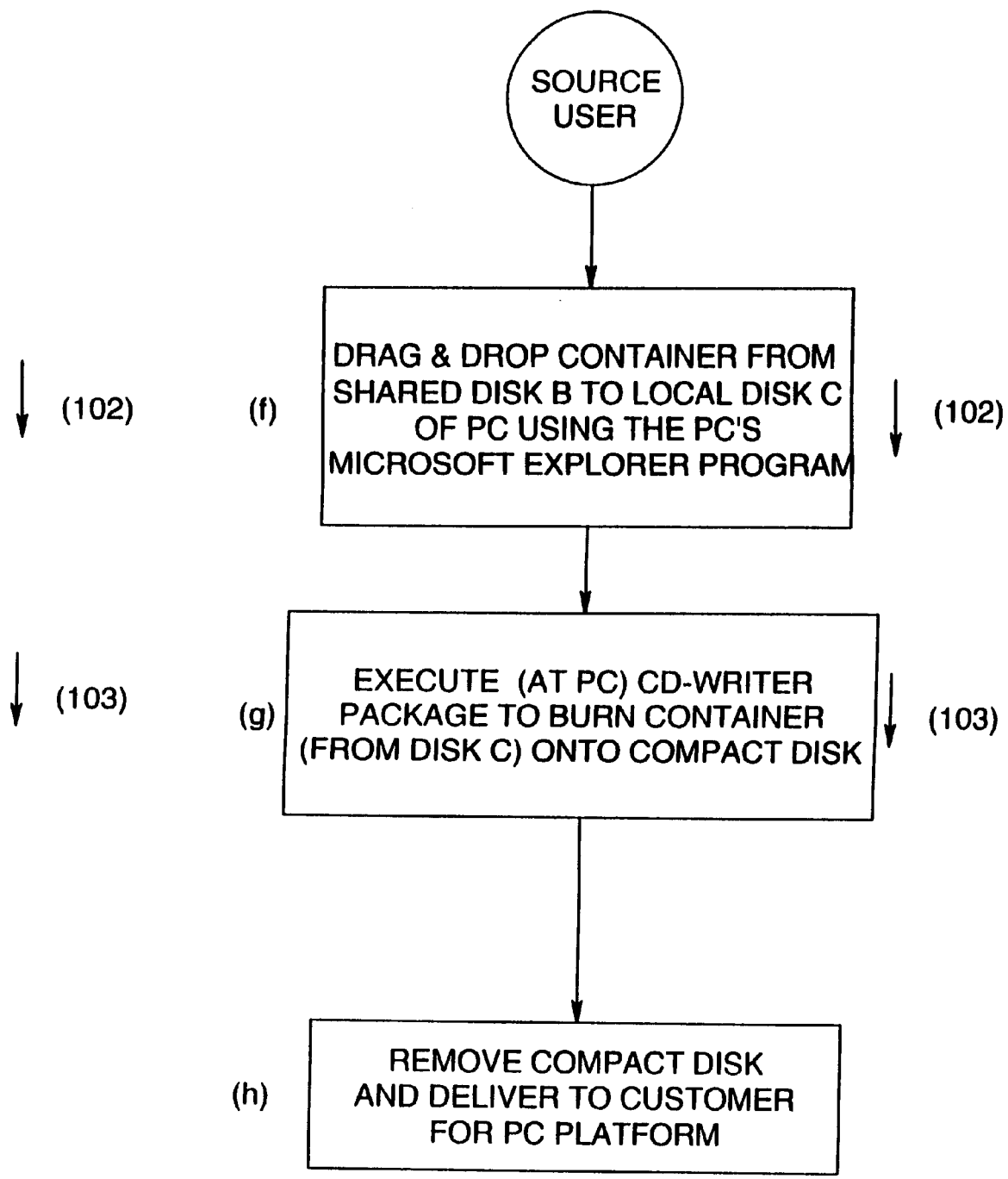

1. The WFL WRAP procedure (FIG. 4) in initiated by the User 10 which then calls the procedure MCP_FILEWRAPPER 36, (FIG. 4B).
2. The MCP_FILEWRAPPER program 36 builds an internal list containing names of files to be wrapped as well as their container names, then calls the procedure EXTRACTLIST (FIG. 4C). This extracts the file names from the "internal list" in memory 18 and reads the files and puts them in the container. The operator terminal 8 or User tells which container is to contain which particular file. The system can handle multiple containers. Some files can go in several different containers. For example, if there were five files, such as files 1, 2, 3, 4, and 5, the User can prescribe that Container A gets file 1, 2, and 3 and Container B gets files 3, 4, and 5. Thus the User 8 can write a statement such as—WRAP 1, 2, 3 into Container A-3, 4, 5, into Container B. "Internal List":—is an array in memory 18 (FIG. 1B). This gives a list of the container file "names" (not the files themselves). This internal list is processed by the EXTRACTLIST (FIG. 4C) program to place what particular files should go into what particular container.

3. For each file name in the Internal List, EXTRACTLIST calls MCP_WRAPPER 38 to wrap the file, passing through the procedure WRITE_WRAP (FIG. 4E).

4. The MCP_WRAPPER 38 procedure then calls the routine designated WRITE_WRAP, FIG. 4E, which is a subprocedure of the MCP_FILE PER 36. WRITE_WRAP writes the data of a wrapped file to a container (MY/CONTAINER/FILE) on Disk B.

5. The MCP_WRAPPER 38, (FIG. 4D), returns to EXTRACTLIST procedure, FIG. 4C, so that EXTRACTLIST repeats the whole process with the next file name in the internal list.

6. When the Internal List is exhausted, the EXTRACTLIST procedure, (FIG. 4C), then calls ENDCONTAINER (FIG. 4F) to write out the container's directory as well as its digital signature.

7. The ENDCONTAINER program after writing out the directory and the address location of each file in the directory, (and optionally digital signature words) then returns to EXTRACTLIST which returns to MCP_FILEWRAPPER.

8. The MCP_FILEWRAPPER 36 then returns to the Work Flow Language wrap (WFLWRAP) program to indicate that the sequence is completed and the file has been wrapped and signatured.

The WRITEWRAP program writes the data of a wrapped file to a container on Disk B. The WRITEWRAP program is used by the MCP_FILEWRAPPER program. The ENDCONTAINER procedure comes from the MCP_FILEWRAPPER program and operates to write out the directory the address location of the directory items, and the container's digital signature and then closes the file to save it on disk as per the file structure of FIG. 3B.

Appendix I is attached to indicate how to run the DSA utility program routine.

Described herein has been a method and system whereby a native specialized container of files in a first computer system, can use the operating system of the first computer system together with first and second programmatic interfaces therein in order to transform a container file (native to the first system) into a standard byte-stream container file which is utilizable by any other typos of computer platforms (second system), and which byte-stream files can be burned into a CD-ROM (or transported via an open network) which is then available for utilization by multiple numbers of other system platforms. The integrity for transforming the native container files of the first system into a standard byte stream container file utilizable by other computer platforms, and which can be transferred over the Internet, is rendered reliably verifiable by the use of the digital signaturing systems described herein.

While other variations and embodiments of the described method and system may be implemented for various purposes, the invention is defined by the following claims appended below.

What is claimed is:

1. A method for wrap-packaging and signaturing a container of specialized first format data files and directory from a first specialized format into a second file in a second format compatible for burning onto an industry-standard Compact Disk, as well as for transmission on the Internet, wherein a primary sourced Operating System 10 of a platform 14 holds a first programmatic routine MCP_FILEWRAPPER and a second programmatic routine MCP_WRAPPER, plus a WRITE-WRAP routine, said Operating System 10 utilizing a Work Flow Language compiler 15 and Signature Support Library 13, and communicating with a secondary platform 30, said method for wrap-packaging and creating a digital signature to verify the validity of the container comprising the steps of:

(a) initiating, by a user, of a WRAP operation together with a digital signature request;

(b) utilizing the WRAP statement of Work Flow Language procedure for making a direct programmatic call to said routine designated as MCP_FILEWRAPPER and passing a private key to indicate the request for a digital signature by utilizing said primary-sourced Operating System (MCP 10) to initiate said specialized routine designated MCP_FILEWRAPPER;

(c) obtaining digital signature parameter information from an active DSAKEYSFILE in said Signature Support Library 13, said parameter information being based on the particular Software Release level of the Operating System 10;

(d) developing a link to said Signature Support Library in order to gain access to said Digital Signature Algorithm routine (DSASIGN);

(e) calling said Digital Signature Algorithm routine of said Signature Support Library in order to digitally sign the ID with a "source company name";

(f) calling said MCP_WRAPPER routine in order to wrap-package a container file from a first specialized format into a second format compatible for the Internet and compatible for burning onto an industry-standard CD-ROM;

(g) calling said WRITE_WRAP routine in order to invoke the Digital Signature Algorithm routine to develop a digital signature for the wrapped container;

(h) developing said wrapped container file together with its digital signature as a resultant file, so that said digital signature can later be used in subsequent operations to verify the integrity of the wrapped container.

2. The method of claim 1 which includes the step of:

(i) placing said container file with signature onto a Compact Disk.

3. The method of claim 1 which includes the step of:

(j) transmitting said container file with signature over an open network.

4. A system initiated by a client-user for digitally signaturing and wrapping a container of a first set of native original files and directory for conversion from a first specialized format into a second format compatible with the File Transfer Protocol of the Internet, said system comprising:

(a) operator terminal means for initiating a first platform and its operating system which operates on a specialized first format protocol;

(b) means for initiating a first program routine (MCP_FILEWRAPPER) in order to access Digital Signature Algorithm (DSA) parameters and to access a Digital Signature Algorithm signature routine in a Signature Support Library;

(c) means for calling a second program routine (MCP_WRAPPER) in order to institute a wrapping action to convert said container of data files and directory from a first specialized format into a second text file format of Internet-compatible protocol;

(d) means for calling a third program routine (WRITE_WRAP) which calls the Digital Signature Algorithm (DSA) to signature the converted container and directory, and also to generate two integers, R & S as a signature to be added to the end of the file;

(e) means to develop an output resultant container constituting the wrapped data files and directory with a digital signature compatible for transfer on the Internet via File Transfer.

* * * * *